United States Patent
Ohtani et al.

(10) Patent No.: US 9,617,166 B2
(45) Date of Patent: Apr. 11, 2017

(54) METAL OXIDE PARTICLE PRODUCTION METHOD AND PRODUCTION DEVICE

(75) Inventors: Bunsho Ohtani, Sapporo (JP);
Noriyuki Sugishita, Toyama (JP);
Yasushi Kuroda, Toyama (JP)

(73) Assignees: National University Corporation Hokkaido University, Hokkaido (JP);
SHOWA DENKO K.K., Tokyo (JP)

( * ) Notice: Subject to any disclaimer, the term of this patent is extended or adjusted under 35 U.S.C. 154(b) by 738 days.

(21) Appl. No.: 13/389,989

(22) PCT Filed: Aug. 3, 2010

(86) PCT No.: PCT/JP2010/063117
§ 371 (c)(1),
(2), (4) Date: Feb. 10, 2012

(87) PCT Pub. No.: WO2011/024617
PCT Pub. Date: Mar. 3, 2011

(65) Prior Publication Data
US 2012/0141362 A1 Jun. 7, 2012

(30) Foreign Application Priority Data
Aug. 24, 2009 (JP) .................... 2009-193213

(51) Int. Cl.
*C01G 23/07* (2006.01)
*B01J 21/06* (2006.01)
(Continued)

(52) U.S. Cl.
CPC ............ *C01G 23/07* (2013.01); *B01J 21/063* (2013.01); *B01J 35/002* (2013.01); *B01J 35/004* (2013.01);
(Continued)

(58) Field of Classification Search
CPC ....................................................... C01G 23/07
(Continued)

(56) References Cited

U.S. PATENT DOCUMENTS

| 6,544,493 B1 | 4/2003 | Tanaka et al. |
| 2005/0076811 A1 | 4/2005 | Kayama et al. |

(Continued)

FOREIGN PATENT DOCUMENTS

| CN | 1810653 A | 8/2006 |
| CN | 101124165 A | 2/2008 |

(Continued)

OTHER PUBLICATIONS

JP 2008303126, Machine Translation.*
(Continued)

*Primary Examiner* — Matthew E Hoban
*Assistant Examiner* — James Fiorito
(74) *Attorney, Agent, or Firm* — Sughrue Mion, PLLC

(57) ABSTRACT

An object of the present invention is to provide a method for producing metal oxide particles, in which metal oxide particles with high photocatalytic activity is produced, and a production apparatus therefor. The above object can be achieved by using a method for producing metal oxide particles, which includes subjecting a reaction gas containing metal chloride and an oxidizing gas containing no metal chloride in a reaction tube (11) to preheating, and then subjecting a combined gas composed of the reaction gas and the oxidizing gas to main heating in a main heating region (A) apart from the downstream side of the junction (5*b*), wherein the time until the combined gas from the junction (5*b*) arrives at the upstream end (A1) of the main heating region (A) is adjusted to be less than 25 milliseconds.

13 Claims, 4 Drawing Sheets

(51) Int. Cl.
  *B01J 35/00* (2006.01)
  *B01J 35/10* (2006.01)
  *B01J 37/08* (2006.01)
  *B01J 37/14* (2006.01)
  *B01J 37/34* (2006.01)
  *C01B 13/22* (2006.01)
  *C01G 23/00* (2006.01)
  *C01G 23/047* (2006.01)

(52) U.S. Cl.
  CPC ......... *B01J 35/1014* (2013.01); *B01J 37/088* (2013.01); *B01J 37/14* (2013.01); *B01J 37/349* (2013.01); *C01B 13/22* (2013.01); *C01G 23/00* (2013.01); *C01G 23/047* (2013.01); *C01P 2002/72* (2013.01); *C01P 2004/03* (2013.01); *C01P 2006/12* (2013.01); *C01P 2006/80* (2013.01)

(58) Field of Classification Search
  USPC ......................................................... 423/613
  See application file for complete search history.

(56) References Cited

U.S. PATENT DOCUMENTS

2005/0271578 A1   12/2005   Terada et al.
2007/0189958 A1   8/2007    Sakai

FOREIGN PATENT DOCUMENTS

| EP | 2221278 A1 | 8/2010 |
| GB | 791657 | 3/1958 |
| JP | 2003-327432 A | 11/2003 |
| JP | 2006-052099 A | 2/2006 |
| JP | 2008-303126 A | 12/2008 |
| WO | WO 01/16027 A1 | 3/2001 |
| WO | WO 2004/063431 A1 | 7/2004 |
| WO | WO 2005/092797 A1 | 10/2005 |
| WO | 2010/044263 A1 | 4/2010 |

OTHER PUBLICATIONS

Daisuke Kusano, et al., "Enka Titanium (IV) no Kiso Sankaho ni yoru Kokassei Sanka Titanium Hikari Shokubai Biryushi no Chosei", Dai 98 Kai CatSJ Meeting, Toronkai A Yokoshu, Sep. 2006, pp. 234, (98th Shokubai Toronkai (Catalyst Forum), Proceedings of Forum A).

Hua Gui Yang, et al., "Anatase TiO2 Single Crystals With a Large Percentage of Reactive Facets", Nature, May 2008, vol. 453, pp. 638-641.

Office Action with a mailing date of Jun. 24, 2013 for corresponding Chinese Patent Application No. 201080033194.5.

Communication dated Jun. 2, 2015 from the European Patent Office in counterpart application No. 10811668.2.

* cited by examiner

METAL OXIDE PARTICLE PRODUCTION METHOD AND PRODUCTION DEVICE

TECHNICAL FIELD

The present invention relates to a method and an apparatus for producing metal oxide particles, and particularly to a method and an apparatus for producing metal oxide particles with high photocatalytic activity when titanium oxide particles are produced by rapidly heating titanium tetrachloride vapor and oxygen in the gas phase.

This application claims priority on Japanese Patent Application No. 2009-193213 filed on Aug. 24, 2009, the disclosure of which is incorporated by reference herein.

BACKGROUND ART

In recent years, attention has been paid to titanium oxide particles in the field of photocatalysts. For example, Patent Documents 1 and 2, and Non Patent Documents 1 and 2 disclose titanium oxide particles which have a decahedral box-like shape and are mainly formed of anatase-type crystals (hereinafter referred to as "decahedral titanium oxide particles").

Patent Documents 1 and 2, and Non Patent Document 1 describe that since decahedral titanium oxide particles have large surface areas per unit mass and have high crystallinity with fewer internal defects, the titanium oxide particles have high activity as photocatalysts. Furthermore, Non Patent Document 2 describes that decahedral titanium oxide particles have a high ratio of the highly reactive (001) plane and are promising as photocatalysts.

A method for producing titanium oxide particles includes, for example, a method in which a hydrothermal reaction using hydrofluoric acid described in Non Patent Document 2 is utilized. However, this production method involves a construction using hydrofluoric acid, and is therefore unsuited for the production on an industrial scale.

The methods for producing decahedral titanium oxide particles described in Patent Documents 1 and 2, and Non Patent Document 1 are methods in which titanium tetrachloride (TiCl$_4$) vapor and oxygen (O$_2$) gas are introduced into a reaction tube, and then these gasses are heated from the outside of the reaction tube, and thus titanium oxide particles (TiO$_2$) are produced by a reaction represented by the following reaction scheme (1):

$$TiCl_4 + O_2 \rightarrow TiO_2 + 2Cl_2 \qquad (1)$$

When the production methods are used, a powder product containing titanium oxide particles can be obtained in the downstream side of the reaction tube. This powder product contains a large proportion of decahedral titanium oxide particles.

However, decahedral titanium oxide particles obtained by the production methods have photocatalytic activity which is insufficient for use in a practical photocatalytic product, and thus further improvement in photocatalytic activity has been required.

CITATION LIST

Patent Document

[Patent Document 1]
PCT International Publication No. WO 04/063431

[Patent Document 2]
Japanese Unexamined Patent Application, First Publication No. 2006-52099

Non Patent Document

[Non Patent Document 1]
Daisuke Kusano, Yoshihiro Terada, Ryu Abe, and Fumiaki Ohtani, 98th Shokubai Toronkai (Catalyst Forum) (September, 2006), Proceedings of Forum A, p. 234
[Non Patent Document 2]
Hua Gui Yang et al., Nature, Vol. 453, p. 638-p. 641

SUMMARY OF INVENTION

Technical Problem

Under these circumstances, the present invention has been made and an object thereof is to provide a method and an apparatus for producing metal oxide particles, in which metal oxide particles with high photocatalytic activity are produced.

Solution to Problem

The present inventors have found that, when a reaction gas containing titanium tetrachloride and an oxidizing gas containing no titanium tetrachloride are subjected to preheating, combined in a reaction tube, and then the combined gas composed of the reaction gas and the oxidizing gas is subjected to main heating in the region apart from the downstream side of the junction, the combined gas is rapidly heated by adjusting the time until the combined gas from the junction arrives at the upstream end of the main heating region to less than 25 milliseconds, thereby making it possible to produce decahedral titanium oxide particles with high photocatalytic activity. Thus, the present invention has been completed.

In order to achieve the above object, the following constructions were employed in the present invention:

(1) A method for producing metal oxide particles, which includes subjecting a reaction gas containing metal chloride and an oxidizing gas containing no metal chloride in a reaction tube to preheating, and then subjecting a combined gas composed of the reaction gas and the oxidizing gas to main heating in a main heating region apart from the downstream side of the junction, wherein the time until the combined gas from the junction arrives at the upstream end of the main heating region is adjusted to be less than 25 milliseconds;

(2) The method for producing metal oxide particles according to (1), wherein the reaction tube includes a double-tube structure portion composed of a hollow outer cylinder and a hollow inner cylinder inserted into the upstream side of the hollow outer cylinder, and the reaction gas is allowed to flow into the hollow inner cylinder and also the oxidizing gas is allowed to flow into a site between the hollow inner cylinder and the hollow outer cylinder, thereby allowing the downstream end portion of the hollow inner cylinder to serve as the junction of the reaction gas and the oxidizing gas;

(3) The method for producing metal oxide particles according to (1) or (2), wherein the metal chloride is titanium tetrachloride, and the metal oxide particles are titanium oxide particles;

(4) The method for producing metal oxide particles according to (3), wherein the titanium oxide particles are decahedral titanium oxide particles;

(5) The method for producing metal oxide particles according to any one of (1) to (4), wherein the preheating temperature is 136° C. or higher and 750° C. or lower;

(6) The method for producing metal oxide particles according to any one of (1) to (5), wherein the main heating temperature is 800° C. or higher and 1,500° C. or lower;

(7) The method for producing metal oxide particles according to any one of (1) to (6), wherein the reaction gas contains one of more of an oxygen gas and a nitrogen gas;

(8) The method for producing metal oxide particles according to any one of (1) to (7), wherein the oxidizing gas contains an oxygen gas, a nitrogen gas, argon, water vapor, or at least two kinds thereof;

(9) The method for producing metal oxide particles according to anyone of (1) to (8), wherein a linear velocity of the oxidizing gas is adjusted to be within a range of from 0.1 to 10 based on a linear velocity of the reaction gas on the upstream side of the downstream end portion of the hollow inner cylinder;

(10) The method for producing metal oxide particles according to any one of (3) to (9), wherein the concentration of titanium tetrachloride contained in the combined gas is adjusted to be from 0.1 to 20% by volume at the downstream side of the downstream end portion of the hollow inner cylinder;

(11) The method for producing metal oxide particles according to any one of claims 1 to 10, wherein the time during which the combined gas remains in the main heating region is adjusted to be from 2 to 500 milliseconds;

(12) The method for producing metal oxide particles according to any one of (1) to (11), wherein the Reynolds number of the combined gas is adjusted to be from 10 to 10,000;

(13) An apparatus for producing metal oxide particles, comprising a reaction tube through which a gas is allowed to flow from the upstream side to the downstream side; a second region in which two or more gasses are allowed to separately flow, provided on the upstream side of the reaction tube; the junction at which a combined gas composed of two or more gasses is formed, provided at the downstream end portion of the second region; a first region in which the combined gas is allowed to flow, provided on the downstream side of the junction; and a main heating region in which the combined gas is subjected to main heating, provided on the way of the first region;

the apparatus further comprising a control unit to control so that the time until the combined gas from the junction arrives at the upstream end of the main heating region is adjusted to be less than 25 milliseconds;

(14) The apparatus for producing metal oxide particles according to (13), wherein the control unit includes means for controlling the flow rate of the combined gas; and

(15) The apparatus for producing metal oxide particles according to (13) or (14), wherein a heat shield plate or a light shield plate is provided outside the reaction tube, between the second region and the main heating region.

Advantageous Effects of Invention

According to the above-mentioned constructions, it is possible to provide a method and an apparatus for producing metal oxide particles, in which metal oxide particles with high photocatalytic activity is produced.

The method for producing metal oxide particles of the present invention includes subjecting a reaction gas containing metal chloride and an oxidizing gas containing no metal chloride in a reaction tube to preheating, and then subjecting a combined gas composed of the reaction gas and the oxidizing gas to main heating in a main heating region apart from the downstream side of the junction, wherein the time until the combined gas from the junction arrives at the upstream end of the main heating region is adjusted to be less than 25 milliseconds. With such a construction, when a reaction gas containing a metal chloride and an oxidizing gas containing no metal chloride are each subjected to preheating, and then the combined gas composed of the reaction gas and the oxidizing gas is subjected to main heating in the region apart from the downstream side of the junction, the combined gas is rapidly heated by adjusting the time until the combined gas from the junction arrives at the upstream end of the main heating region to less than 25 milliseconds, thereby making it possible to produce metal oxide particles with high photocatalytic activity.

In the method for producing metal oxide particles of the present invention, the metal chloride is titanium tetrachloride and the metal oxide particles are titanium oxide particles. With such a composition, when a reaction gas containing titanium tetrachloride and an oxidizing gas containing no titanium tetrachloride are each subjected to preheating, and then the combined gas composed of the reaction gas and the oxidizing gas is subjected to main heating in the region apart from the downstream side of the junction, the combined gas is rapidly heated by adjusting the time until the combined gas from the junction arrives at the upstream end of the main heating region to less than 25 milliseconds, thereby making it possible to produce titanium oxide particles with high photocatalytic activity in which the proportion of decahedral titanium oxide particles in the obtained powder product is high and the proportion of rutile is 2% or less.

The apparatus for producing metal oxide particles of the present invention includes a reaction tube through which a gas is allowed to flow from the upstream side to the downstream side; a second region in which two or more gasses are allowed to separately flow, provided on the upstream side of the reaction tube; the junction at which a combined gas composed of two or more gasses is formed, provided at the downstream end portion of the second region; a first region in which the combined gas is allowed to flow, provided on the downstream side of the junction; and a main heating region in which the combined gas is subjected to main heating, provided on the way of the first region; the apparatus further including a control unit to control so that the time until the combined gas from the junction arrives at the upstream end of the main heating region is adjusted to be less than 25 milliseconds. With such a construction, when a reaction gas containing titanium tetrachloride and an oxidizing gas containing no titanium tetrachloride are each subjected to preheating, combined in a reaction tube to form a combined gas, and then the combined gas is subjected to main heating in the region apart from the downstream side of the junction, the combined gas is rapidly heated by adjusting the time until the combined gas from the junction arrives at the upstream end of the main heating region to less than 25 milliseconds, thereby making it possible to produce metal oxide particles with high photocatalytic activity.

DESCRIPTION OF EMBODIMENTS

Mode for carrying out the present invention will be described below.

Embodiments

Apparatus for Producing Metal Oxide Particles

Figure 1:
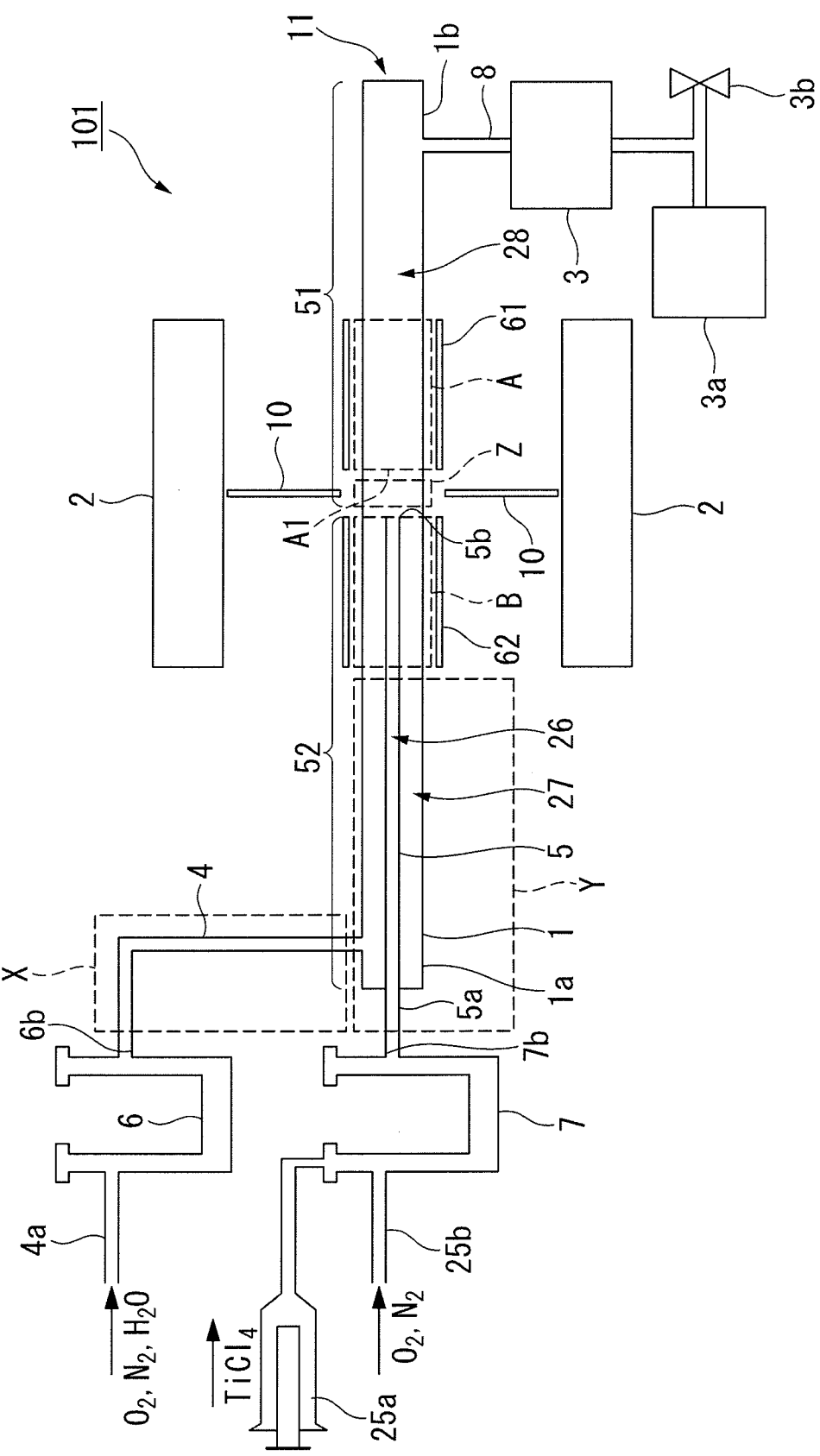
FIG. 1 is a schematic view showing an example of an apparatus for producing metal oxide particles of the present invention.

FIG. 1 is a schematic view showing an example of an apparatus for producing metal oxide particles according to an embodiment of the present invention.

As shown in FIG. 1, the apparatus 101 for producing metal oxide particles according to an embodiment of the present invention is schematically configured to include a reaction tube 11 composed of a hollow outer cylinder 1 and a hollow inner cylinder 5 which is inserted from a site in the upstream side (upstream portion) 1a of the hollow outer cylinder 1 into a site in the middle of the hollow outer cylinder 1; and a heating device 2 which is disposed on the outside of the reaction tube 11 so as to locally heat the reaction tube 11.

Oxidizing Gas Introducing Tube

To an upstream side 1a of the hollow outer cylinder 1, an oxidizing gas introducing tube 4 for introducing an oxidizing gas containing no metal chloride is connected. The oxidizing gas introducing tube 4 is connected to another oxidizing gas introducing tube 4a through a vaporizer 6. Another oxidizing gas introducing tube 4a is connected to a supply source (not shown) of oxygen ($O_2$), nitrogen ($N_2$) and water through a valve.

The temperature of the vaporizer 6 is, for example, adjusted to 165° C., and water introduced through another oxidizing gas introducing tube 4a is vaporized to form water vapor. Whereby, the vaporizer 6 is configured of being capable of supplying an oxidizing gas composed of a mixed gas of oxygen, nitrogen and water vapor to the hollow outer cylinder 1 through the oxidizing gas introducing tube 4.

The oxidizing gas is a gas which does not contain a metal chloride such as titanium tetrachloride. Specific examples of the oxidizing gas include oxygen ($O_2$), inert gas such as nitrogen or argon, water vapor and ozone ($O_3$), and these oxidizing gases may be used alone or in combination. Therefore, examples which can be used include oxygen alone, nitrogen alone, argon alone, a mixed gas of oxygen and an inert gas such as argon, a mixed gas of oxygen and water vapor, a mixed gas of oxygen, water vapor and an inert gas, a mixed gas of water vapor and an inert gas, and the like. Air may also be used as a mixed gas of oxygen and an inert gas.

Reaction Gas Introducing Tube

To an upstream side 5a of a hollow inner cylinder 5, reaction gas introducing tubes 25a, 25b for introducing a reaction gas containing vapor of metal chloride such as titanium tetrachloride ($TiCl_4$) are connected through another vaporizer 7.

The reaction gas introducing tube 25a is connected to a supply source (not shown) of metal chloride through a valve and is configured of being capable of supplying a metal chloride to a hollow inner cylinder 5. The reaction gas introducing tube 25b is connected to a supply source of oxygen and nitrogen through a valve, and is configured of being capable of supplying oxygen and nitrogen gases to a hollow inner cylinder 5.

The temperature of the vaporizer 7 is set at, for example, 165° C., and the vaporizer 7 vaporizes a metal chloride to form a metal chloride vapor. This configuration is capable of supplying a reaction gas composed of a mixed gas of oxygen, nitrogen and metal chloride vapor to the hollow inner cylinder 5.

The reaction gas is a gas containing titanium tetrachloride vapor. Specifically, it is possible to use, as the reaction gas, a mixed gas of titanium tetrachloride vapor and oxygen, a mixed gas of titanium tetrachloride vapor and an inert gas or a mixed gas of titanium tetrachloride vapor, oxygen and an inert gas. Air may be used as a mixed gas of oxygen and an inert gas.

Control Unit

The present production apparatus includes a control unit (not shown in FIG. 1) equipped with means for adjusting flow rates of a reaction gas and an oxidizing gas to control the flow rate of a combined gas. Control of the flow rate of the combined gas by the control unit enables control of the time until the combined gas from the junction arrives at the upstream end of the main heating region.

Reaction Tube

As shown in FIG. 1, the reaction tube 11 is configured to include a hollow outer cylinder 1 and a hollow inner cylinder 5. The reaction tube 11 is, for example, a cylindrical tube made of quartz or the like.

The hollow inner cylinder 5 is inserted from a site on the upstream side 1a into a site in the middle of the hollow outer cylinder 1, and the downstream end portion 5b of the hollow inner 1 cylinder is disposed near the center in the longitudinal direction of the hollow outer cylinder 1. Whereby, the reaction tube 11 includes a second region (double-tube structure portion) 52 composed of a hollow outer cylinder 1 and a hollow inner cylinder 5, and a first region (single-tube structure portion) 51 composed only of a hollow outer cylinder 1. That is, the reaction tube 11 has a double-tube structure at the upstream side of the downstream end portion 5b of the hollow inner cylinder 5, and a single-tube structure at the downstream side thereof. Therefore, in the second region 52, two or more gasses can be allowed to separately flow, and first region 51 is configured to allow a combined gas prepared by combining two or more gasses to flow.

The hollow inner cylinder 5 includes an opening of inner cylinder 26 through which a gas is allowed to flow. Also, the hollow outer cylinder 1 includes an opening of outer cylinder 28 through which a gas is allowed to flow. In the second region 52, a ring-shaped opening 27 between the hollow outer cylinder 1 and the hollow inner cylinder 5 is provided.

In the second region 52, the hollow outer cylinder 1 and the hollow inner cylinder 5 are preferably constructed as a coaxial structures. Thereby, a reaction gas can be collected in the central axis side and diffusion of a reaction gas toward the inner wall surface of the reaction tube 11 can be suppressed, and thus the generation of film-like products (side products) that deposit on the inner wall surface of the reaction tube can be suppressed.

Heating Device

As shown in FIG. 1, two heating devices 2 are disposed at the outside of the reaction tube 11 so as to dispose the downstream end portion 5b of the hollow inner cylinder 5 in the center. As the heating device 2, for example, an infrared gold image furnace is used. The infrared gold image furnace is an apparatus for performing a heating operation through irradiation of infrared rays. The heating device 2 is not limited to the infrared gold image furnace, and an oxyhydrogen burner, an electric heater and the like may be used.

In the region interposed between heating devices 2, a temperature sensor (thermocouple) is disposed on an outer surface of a platinum plate 62 wound around the outside of the reaction tube 11 in the upstream side and an outer surface of a platinum plate 61 wound around the outside of the reaction tube 11 in the downstream side, respectively. Using a temperature sensor, the temperatures of the platinum plates 61, 62 heated by infrared rays irradiated from the heating devices 2 are measured and an infrared intensity on the upstream and downstream sides of heating devices 2 is controlled according to these measuring temperatures, and thus the temperatures of the preheating region B and the main heating region A are controlled.

The method of controlling the temperature of the heating device 2 is not limited to the above method, and an infrared sensor may be disposed, or a temperature controller using these sensors in combination may be disposed.

Preheating Region

In an apparatus 101 for producing metal oxide particles according to an embodiment of the present invention, three preheating regions B, X, Y are provided.

The preheating region B is a region in which a platinum plate 62 is wound around a hollow outer cylinder 1, and two heating devices 2 are disposed at the outside. The platinum plate 62 absorbs infrared rays irradiated from the heating device 2 such as an infrared gold image furnace to generate heat, thereby locally heating only the portion where the platinum plate 62 is wound around the cylinder. The temperature of the reaction gas and the oxidizing gas is adjusted to a predetermined preheating temperature (hereinafter referred to as a preheating temperature) by passing the reaction gas and the oxidizing gas through the region.

The preheating region X is a region from an outlet 6b of a vaporizer 6 to a hollow outer cylinder 1 and an electric heater (not shown) is disposed at the outside thereof. The temperature of the oxidizing gas is adjusted to a predetermined preheating temperature by passing the oxidizing gas through the interior of an oxidizing gas introducing tube 4 of the preheating region X.

The preheating region Y is a region from an outlet 7b of a vaporizer 7 to the upstream side of a heating device 2 and an electric heater (not shown) is disposed on the outside thereof. The temperature of the reaction gas and the oxidizing gas is adjusted to a predetermined preheating temperature by passing the reaction gas and the oxidizing gas through the interior of a reaction tube 11 of the preheating region Y.

The preheating temperature of the preheating regions X, Y and B is preferably adjusted to a temperature within a range of equal to or higher than 136° C. and lower than or equal to 750° C., more preferably equal to or higher than 500° C. and lower than or equal to 750° C., and still more preferably equal to or higher than 600° C. and lower than or equal to 750° C. It is possible to preheat the reaction gas and the oxidizing gas without causing the generation of film-like products or the like by adjusting the temperature to be within a range of equal to or higher than 136° C. and lower than or equal to 750° C. It is also possible to enhance the uniformity of the reaction gas and the oxidizing gas by adjusting the temperature to be within a range of equal to or higher than 600° C. and lower than or equal to 750° C., and thus decahedral titanium oxide particles with high photocatalytic activity can be efficiently obtained, finally.

In the production apparatus 101, when the preheating temperature of the reaction gas and the oxidizing gas is equal to or higher than 136° C. and lower than 500° C., a temperature difference between a preheating temperature and main heating temperature increases. As a result, a temperature difference between a combined gas in the vicinity of the inner wall surface and a combined gas in the vicinity of the central axis in the main heating region A increases, and thus titanium oxide particles are synthesized under un-uniform temperature conditions.

In contrast, when the preheating temperature of the reaction gas and the oxidizing gas is equal to or higher than 500° C. and lower than or equal to 750° C., a temperature difference between a preheating temperature and a main heating temperature decreases. As a result, a temperature difference between a combined gas in the vicinity of the inner wall surface and a combined gas in the vicinity of the central axis in the main heating region A decreases, and thus titanium oxide particles are synthesized under more uniform temperature conditions.

As a result, when the preheating temperature of the reaction gas and the oxidizing gas is equal to or higher than 500° C. and lower than or equal to 750° C., the proportion of decahedral titanium oxide particles in the obtained powder product increases as compared with the case where the preheating temperature is lower than 500° C., and thus decahedral titanium oxide particles with high photocatalytic activity are obtained.

For example, when a gas containing titanium tetrachloride vapor and oxygen is used as the reaction gas, if the preheating temperature of the preheating regions X, Y and B is 800° C. or higher, the oxidization reaction may proceed between titanium tetrachloride vapor and oxygen flowing in the hollow inner cylinder 5, and thus the titanium oxide particles are formed in the hollow inner cylinder 5 and also the film-like product is formed on the inner wall surface of the hollow inner cylinder 5. In this state, when the titanium oxide particles are continuously produced, the inside of the hollow inner cylinder 5 may be blocked by the film-like product. For this reason, when the reaction gas contains oxygen, it is preferred that the preheating temperature is adjusted to be lower than 800° C. Taking a variation in the heating temperature into consideration, it is more preferred that the preheating temperatures of the reaction gas and the oxidizing gas in the preheating regions X, Y and B are adjusted 750° C. or lower, respectively. In contrast, when the preheating temperatures of the preheating regions X, Y and B are adjusted to be lower than 136° C. which is a boiling point of titanium tetrachloride, a part of the titanium tetrachloride vapor may be sometimes condensed in the hollow inner cylinder 5.

Main Heating Region

The first region 51 at the downstream side of the reaction tube 11 is provided with a main heating region A.

The main heating region A is a region in which a platinum plate 61 is wound around a hollow outer cylinder 1, and two heating devices 2 are provided on the outside of the reaction tube 11. The platinum plate 61 absorbs infrared rays irradiated from the heating device 2 such as an infrared gold image furnace to generate heat, thereby locally heating only the portion where the platinum plate 61 is wound around the cylinder. The temperature of the reaction gas and the oxidizing gas is adjusted to a predetermined main heating temperature (hereinafter referred to as a main heating temperature) bypassing the reaction gas and the oxidizing gas through the region.

The main heating temperature is preferably adjusted to be within a range of equal to or higher than 800° C. and lower than or equal to 1,500° C., more preferably equal to or higher than 1,000° C. and lower than or equal to 1,300° C., and still more preferably equal to or higher than 1,100° C. and lower than or equal to 1,200° C. When the main heating temperature is adjusted to be within a range of equal to or higher than 800° C. and lower than or equal to 1,500° C., the oxidation reaction of metal chloride, represented by the reaction scheme (1), can be efficiently carried out in a gas phase.

For example, the oxidation reaction between titanium tetrachloride vapor and oxygen can be allowed to proceed efficiently, and thus titanium oxide particles can be efficiently formed.

When the main heating temperature is lower than 800° C., the oxidation reaction between the titanium tetrachloride vapor and oxygen represented by the above-mentioned reaction scheme (1) does not proceed and thus titanium oxide particles cannot be formed. When the main heating temperature is lower than 1,100° C., titanium tetrachloride vapor supplied in the reaction tube 11 is not completely consumed, and a part of the unreacted titanium tetrachloride vapor may sometimes remain.

In contrast, when the main heating temperature is higher than 1,500° C., titanium oxide particles adhere to each other, and thus the specific surface area of titanium oxide particles decreases and transition from the anatase crystal structure to the rutile crystal structure proceeds, so that the proportion of rutile is increased. Whereby, the photocatalytic activity of the titanium oxide particles decreases. When the main heating temperature is higher than 1200° C., titanium oxide particles remarkably adhere to each other, and thus the specific surface area of titanium oxide particles decreases and also the proportion of rutile increases, resulting in deterioration of photocatalytic characteristic of titanium oxide particles.

When the combined gas passes through the main heating region A, metal oxide formed in the combined gas is rapidly cooled to form metal oxide particles having a predetermined particle size.

Middle Region

Between a preheating region B and a main heating region A, a middle region Z is provided.

The length of the middle region Z is adjusted so that it becomes less than 25 v (cm) when a flow rate of the combined gas is v (cm/millisecond). Whereby, when the combined gas is allowed to flow at a flow rate of v (cm/millisecond), it is possible to transfer the combined gas to the main heating region A within a short time of less than 25 milliseconds after formation of the combined gas. It is possible to efficiently form metal oxide such as decahedral titanium oxide particles with high photocatalytic activity by transferring the combined gas to the main heating region A within less than 25 milliseconds after formation of the combined gas and rapidly heating the combined gas.

The time until the combined gas arrives at an upstream end A1 of the main heating region A from the junction 5b is defined as a transfer time. When the length of the middle region Z is increased thereby adjusting the transfer time to 25 milliseconds or more, it becomes impossible to rapidly heat the combined gas, and thus decahedral titanium oxide particles with high photocatalytic activity cannot be efficiently formed.

When the middle region Z is ensured, a given distance between a downstream end portion of the preheating region B and an upstream end portion of the main heating region A is ensured, thereby making the temperature of the preheating region B uniform. If the middle region Z is not provided, un-uniform temperature distribution generates an increase in temperature of the downstream side of the preheating region B.

Light Shield Plate

Between a heating device 2 and a reaction tube 11, and between a main heating region A and a preheating region B, a light shield plate 10 is disposed so that a plate surface becomes perpendicular to a longitudinal direction of a reaction tube 1. When the light shield plate 10 is disposed in such a way, it is possible to separate infrared rays to be irradiated from each of upstream and downstream sides of the heating device 2, and thus the temperatures of the preheating region B and the main heating region A can each be set independently.

If the light shield plate 10 is not disposed, for example, a platinum plate 62 on the upstream side is irradiated with infrared rays emitted on the downstream side of the heating device 2, and thus generating the case where the temperature of the preheating region B is adjusted to the setting temperature or higher. In particular, when the length of the middle region Z is decreased so as to adjust the transfer time to less than 25 milliseconds, it is effective to provide the light shield plate 10.

When an oxyhydrogen burner or an electric heater is used as the heating device 2, a heat shield plate is preferably used in place of the light shield plate 10.

Product Recovery Unit

To a downstream side 1b of a hollow outer cylinder 1, a product recovery unit 3, which recovers a product such as metal oxide particles, is connected through a discharge tube 8. The product recovery unit 3 is formed of a bag filter or the like and can recover the thus formed metal oxide particles.

An exhaust pump 3a and a pressure regulator valve 3b are connected to the downstream side of the product recovery unit 3. Usually, as products collect in the product recovery unit 3 and the filter becomes clogged, the pressure in the reaction tube 11 increases. By performing suction with an exhaust pump 3a, this pressure increase can be suppressed, and the oxidation reaction to a metal oxide can be carried out at near normal pressure. In this case, it is preferable to regulate the suction power of the exhaust pump 3a by controlling the pressure regulator valve 3b. Whereby, metal oxide particles can be more efficiently produced.

When titanium tetrachloride is used as the metal chloride, the metal oxide particles recovered at the product recovery unit 3 are obtained as decahedral titanium oxide particles, or as titanium oxide particles other than decahedral titanium oxide particles.

Decahedral titanium oxide particles mean titanium oxide particles having a decahedral box-like shape, as defined in Patent Document 1.

Furthermore, titanium oxide particles other than decahedral titanium oxide particles mean those that are not defined as the above-mentioned decahedral titanium oxide particles, among the titanium oxide particles obtained by the production method of the present embodiment.

Method for Production of Metal Oxide Particles

The method for producing metal oxide particles according to an embodiment of the present invention will be described below with reference to the apparatus 101 for producing metal oxide particles shown in FIG. 1.

The method for producing metal oxide particles according to an embodiment of the present invention includes the steps of respectively preheating a reaction gas containing metal chloride and an oxidizing gas containing no metal chloride at a preheating temperature (hereinafter referred to as a preheating step); combining the reaction gas with the oxidizing gas to form a combined gas and then transferring the combined gas to a main heating region set at a main heating temperature of the preheating temperature or higher within 25 milliseconds (hereinafter referred to as a combine step); and heating the combined gas at the main heating region to produce metal oxide particles (hereinafter referred to as a main heating step). The case of producing titanium oxide as the metal oxide particles using titanium tetrachloride as the metal chloride, will be described below.

Preheating Step

As shown in FIG. 1, first, oxygen, nitrogen and water are introduced through an oxidizing gas introducing tube 4a. After converting water into water vapor by a vaporizer 6, a mixed gas composed of oxygen, nitrogen and water vapor (hereinafter referred to as an oxidizing gas) is allowed to flow into an oxidizing gas introducing tube 4.

The oxidizing gas is heated to a given preheating temperature while passing through a preheating region X and passing through a ring-shaped opening 27 between a hollow outer cylinder 1 and a hollow inner cylinder 5 of preheating regions Y, B.

In contrast, titanium tetrachloride is introduced through a reaction gas introducing tube 25a. After converting titanium tetrachloride into vapor by a vaporizer 7, the vapor is mixed with oxygen and nitrogen introduced through another reaction gas introducing tube 25b, and a mixed gas composed of titanium tetrachloride vapor, oxygen and nitrogen (hereinafter referred to as a reaction gas) is allowed to flow into the hollow inner cylinder 5.

Then, the reaction gas is heated to a given preheating temperature while passing through an opening of inner cylinder 26 of the hollow inner cylinder 5 of preheating regions Y, B.

The temperatures of the reaction gas and the oxidizing gas are controlled to arbitrary temperature more accurately within a short time by heating in three preheating regions X, Y and B.

Combining Step

The reaction gas ejected from the downstream end portion 5b of the hollow inner cylinder 5 is combined with the oxidizing gas ejected from a ring-shaped opening at the downstream end portion 5b of the hollow inner cylinder 5 to form a combined gas. That is, the downstream end portion 5b of the hollow inner cylinder 5 served as the junction.

The combined gas is transferred to the main heating region A within 25 milliseconds after combining by controlling the flow rate of the combined gas through a control unit (not shown). That is, the combined gas arrives at the upstream end A1 of the main heating region A within 25 milliseconds after combining.

Main Heating Step

In the main heating region A, the combined gas is subjected to main heating at the above-mentioned main heating temperature and metal chloride is converted into metal oxide by the oxidation reaction of reaction scheme (1). When the combined gas passes through the main heating region A, metal oxide in the combined gas is rapidly cooled to form a powder product composed of metal oxide particles.

A plurality of decahedral titanium oxide particles, each having different photocatalytic activity, can be obtained by varying a main heating temperature and heating condition. In order to efficiently produce decahedral titanium oxide particles with high photocatalytic activity, it is preferred to rapidly heat a raw material gas composed of titanium tetrachloride vapor and an oxidizing gas to a main heating temperature from a preheating temperature.

By rapidly heating the combined gas, the proportion of decahedral titanium oxide particles in the powder product can be increased and a lot of metal oxide particles with high photocatalytic activity can be produced. For example, titanium oxide particles contain a large amount of decahedral titanium oxide particles with high photocatalytic activity.

In order to rapidly heating titanium tetrachloride vapor, for example, the transfer time may be shorten. In order to shorten the transfer time, the length of the middle region Z may be decreased, or the flow rate of the combined gas may be increased.

The transfer time of the combined gas is preferably less than 25 milliseconds, more preferably 20 milliseconds or less, and still more preferably 10 milliseconds or less.

When the transfer time is shorten to less than 25 milliseconds and the combined gas is rapidly heated to the main heating temperature at which the oxidation reaction proceeds, the oxidation reaction can be efficiently carried out and metal chloride can be converted into metal oxide particles such as decahedral titanium oxide particles with high photocatalytic activity. Also, the combined gas can be efficiently supplied into the main heating region A, and thus titanium tetrachloride consumed immediately by the oxidation reaction can be efficiently supplemented. Also, the proportion of decahedral titanium oxide particles in the powder product can be increased. In addition, metal oxide particles with high photocatalytic activity can be obtained by decreasing the proportion of rutile to 1% or less.

In contrast, when the transfer time is adjusted to be 25 milliseconds or more, there may arise the case where the combined gas cannot be efficiently supplied into the main heating region A, and thus the proportion of decahedral titanium oxide particles in the powder product may decrease and also photocatalytic activity may become lower.

In the main heating region A, the temperature of the combined gas in the vicinity of the inner wall surface of the reaction tube 11 becomes higher than the temperature of the combined gas in the vicinity of the central axis of the reaction tube 11. That is, a difference in temperature occurs between the combined gas in the vicinity of the inner wall surface and the combined gas in the vicinity of the central axis.

In the main heating region A, since the inner wall surface of the reaction tube 11 to be heated by the heating device 2 existing outside is heated to the highest temperature, the oxidation reaction is likely to occur in this portion and film-like products are deposited on the inner wall surface of the reaction tube 11. The film-like products are likely to be produced as the concentration of titanium tetrachloride vapor increases.

[Concentration of Titanium Tetrachloride]

In the first region (single-tube structure portion) 51, the concentration of titanium tetrachloride in the combined gas, flowing in the hollow outer cylinder 1, is preferably adjusted to be from 0.1 to 20% by volume, more preferably 0.1 to 5% by volume, and still more preferably to be from 0.2 to 2% by volume. It is possible to obtain decahedral titanium oxide particles with high photocatalytic activity by adjusting the concentration of titanium tetrachloride in the combined gas within the above range, flowing in the hollow outer cylinder 1.

In the first region (single-tube structure portion) 51, as the concentration of titanium tetrachloride in the combined gas, flowing in the hollow inner cylinder 1, decreases, the primary particle size of titanium oxide particles constituting the powder product decreases and the specific surface area increases. It is possible to obtain a powder product with high photocatalytic activity by adjusting the concentration of titanium tetrachloride in the combined gas, flowing in the hollow outer cylinder 1 within the above range.

[Linear Velocity]

In the second region (double-tube structure portion) 52, the linear velocity of the oxidizing gas is preferably adjusted to be within a range of from 0.1 to 10, more preferably from 0.25 to 4, and still more preferably from 0.3 to 3, based on the linear velocity of the reaction gas.

By allowing the reaction gas and the oxidizing gas to flow at about the same rate, the proportion of decahedral titanium oxide particles in the obtained powder product increases and also photocatalytic activity increases.

In the second region (double-tube structure portion) 52, when the linear velocity of the oxidizing gas is adjusted to be less than 0.1 or more than 10 based on the linear velocity of the reaction gas, the proportion of decahedral titanium oxide particles in the powder product decreases and also photocatalytic activity decreases.

[Residence Time]

The time during which the combined gas remains in the main heating region A (hereinafter referred to as a residence time) is preferably within a range of from 2 to 500 milliseconds, more preferably of from 50 to 250 milliseconds, and still more preferably of from 50 to 150 milliseconds.

When the residence time is more than 500 milliseconds, titanium oxide particles are likely to adhere to each other and the proportion of rutile increases, and thus the proportion of decahedral titanium oxide particles in the powder product decreases and photocatalytic activity decreases.

In contrast, when the residence time is less than 2 milliseconds, the oxidation reaction of titanium tetrachloride is not completely carried out in case of passing through the main heating region A. Therefore, the unreacted titanium tetrachloride remains and the productivity of titanium oxide particles deteriorates, and the proportion of decahedral titanium oxide particles in the powder product decreases and photocatalytic activity decreases.

[Reynolds Number]

The Reynolds number of the combined gas is preferably within a range of from 10 to 10,000, more preferably of from 20 to 2,000, and still more preferably of from 40 to 500.

When the Reynolds number is adjusted to be within the above range, it is possible to enhance the effect of the oxidizing gas that suppresses diffusion of the titanium tetrachloride vapor toward the outside of the reaction tube 11. Whereby, it is possible to decrease the amount of film-like products formed on the inner wall surface of the reaction tube 11. In case of laminar flow in which the Reynolds number is within a range of from 40 to 500, the highest effect is exerted.

When the Reynolds number is more than 10,000, the turbulent state of the combined gas becomes more noticeable, and the effect of the oxidizing gas that suppresses diffusion of the titanium tetrachloride vapor from the vicinity of the central axis of the reaction tube 11 toward the inner wall surface side, is lost, and thus the deposit amount of film-like products on the inner wall surface of the reaction tube 11 increases.

In contrast, when the Reynolds number is less than 10, the linear velocities of the reaction gas and the oxidizing gas respectively decreases, and the effect of the oxidizing gas that suppresses diffusion of the titanium tetrachloride vapor from the vicinity of the central axis of the reaction tube 11 toward the inner wall surface side, is lost, and thus the deposit amount of film-like products on the inner wall surface of the reaction tube 11 increases.

When the Reynolds number is adjusted to be within a range of from 10 to 10,000, the proportion of decahedral particles in the powder product increases and also photocatalytic activity increases. In contrast, when the Reynolds number of the combined gas is less than 10 or more than 10,000, the proportion of decahedral particles in the powder product decreases and also photocatalytic activity decreases.

The Reynolds number Re is calculated by the equation: $Re = D \times u \times \rho / \mu$, where D denotes an inner diameter (m) of a hollow outer cylinder 1, u denotes a linear velocity (m/s), $\rho$ denotes density ($kg/m^3$), and $\mu$ denotes viscosity [$kg/(m \times s)$].

In the present embodiment, 21 (mm) is used as the value of the inner diameter D of the hollow outer cylinder 1. The linear velocity (value calculated in terms of main heating temperature) of the combined gas ($Cl_2 + O_2$) after the reaction is used as the value of u. The density (value calculated in terms of main heating temperature) of the combined gas ($Cl_2 + O_2$) after the reaction is used as the value of $\rho$. In addition, the viscosity (value calculated in terms of main heating temperature) of the combined gas after the reaction is used as the value of $\mu$.

[Linear Velocity u of Combined Gas]

The linear velocity u (value calculated in terms of main heating temperature) of the reaction gas ($TiCl_4 + O_2$) is used as the value of the linear velocity u of the combined gas ($Cl_2 + O_2$) after reaction.

When $TiCl_4$ contained in the reaction gas has been completely consumed by the reaction of the above-mentioned reaction scheme (1), $Cl_2$ is produced in an amount (flow rate) of twice the amount of $TiCl_4$, and also $O_2$ is consumed in an amount equal to the amount of $TiCL_4$, and thus the flow rate of $O_2$ is reduced. However, since $TiO_2$ thus produced is in the form of particles and is not a gas, eventually there is no change in the overall flow rate of the gases that flow through before and after this reaction.

[Density $\rho$ of Combined Gas]

In order to calculate the value of the density $\rho$ of the combined gas ($Cl_2 + O_2$) after the reaction, the flow rate (that is, flow rate of the reaction gas) of the combined gas after the reaction flowing per unit time is used.

First, the flow rate obtained by calculating the flow rate of the combined gas after the reaction, in terms of the main heating temperature, is designated as $X_{main\ heating\ temperature}$ (m$^3$). The mass $Y_{0°\ C., 1\ atm}$ (kg) of the combined gas is determined by using the flow rate in the normal state (0° C., 1 atm) of the flow rate $X_{main\ heating\ temperature}$ (m$^3$) of the combined gas after the reaction. At this time, the density ρ of the combined gas after the reaction is $Y_{0°\ C., 1\ atm}$ (kg)/$X_{main\ heating\ temperature}$ (m$^3$).

In the calculation of the viscosity p of the combined gas (Cl$_2$+O$_2$) after the reaction, the calculation equation: μ=exp{a+b×ln(t+273)} is used. In the calculation equation, t denotes a temperature (° C.), and is a main heating temperature as used herein. Furthermore, a and b are constants determined by the type of gases used, wherein a=0.015 and b=0.864 for Cl$_2$; and a=1.289 and b=0.711 for O$_2$. These values of a and b are values obtained by solving simultaneous equations for a and b using a combination of t and μ, which are already known.

The viscosity μ of the combined gas (Cl$_2$+O$_2$) after the reaction is averaged by the equation shown below, and thus the viscosity μ (value calculated in terms of the main heating temperature) of the combined gas after the reaction is determined.

> Viscosity μ (at 1,200° C.) of combined gas after reaction={(value calculated in terms of main heating temperature of the flow rate of Cl$_2$)× (viscosity of Cl$_2$ at the time of main heating temperature)+(value calculated in terms of main heating temperature of the flow rate of O$_2$)× (viscosity of O$_2$ at the time of main heating temperature)}/{flow rate of combined gas (Cl$_2$+O$_2$) after reaction}

While the present invention was described by way of titanium oxide particles as an example of the metal oxide particles, the invention is not intended to be limited to this, and the metal oxide particles may also be, for example, silicon oxide particles or tin oxide particles. In case of producing these metal oxide particles, the reaction gas containing silicon tetrachloride vapor and tin tetrachloride vapor are each used.

In case of producing titanium oxide particles as the metal oxide particles, it is most preferable to use a mixed gas composed of titanium tetrachloride vapor and oxygen as the reaction gas, and oxygen gas as the oxidizing gas. When this combination is used, the "proportion of decahedral titanium oxide particles in the powder product" can be increased and, thus photocatalytic activity of the obtained powder product can be increased and generation of film-like products formed on the inner wall surface of the reaction tube 11 can be suppressed.

It is also possible to use a mixed gas composed of titanium tetrachloride vapor and nitrogen as the reaction gas, and to use an oxygen gas as the oxidizing gas. Also in this case, the "proportion of decahedral titanium oxide particles in the powder product" can be increased, and thus titanium oxide particles with high photocatalytic activity can be obtained.

Furthermore, it is also possible to use a mixed gas composed of titanium tetrachloride vapor and oxygen as the reaction gas, and to use a mixed gas composed of oxygen and water vapor as the oxidizing gas.

In this case, it is possible to obtain a product in a different state according to the value of a ratio of (substance amount [mol] of water)/(substance amount [mol] of titanium tetrachloride). For example, when the ratio of (substance amount [mol] of water)/(substance amount [mol] of titanium tetrachloride) is 3 or more, no film-like products are deposited on the inner wall surface of the reaction tube 11 and thus a cylindrical solid product grows at the downstream end portion 5b of the hollow inner cylinder 5. This phenomenon becomes more noticeable as the ratio (the amount [mol] of water)/(the amount [mol] of titanium tetrachloride) increases. Also, mutual adhesion between particles in the powder product remarkably increases. When the ratio of (the amount [mol] of water)/(the amount [mol] of titanium tetrachloride) is adjusted to be within a range of from 0.5 to 3, the growth of a cylindrical solid product at the downstream end portion 5b of the hollow inner cylinder 5 is suppressed and thus the length thereof is shortened. As the supply amount of water vapor increases within this range, the amount of film-like products decrease and mutual adhesion between particles in the powder product increases.

The method for producing metal oxide particles according to the embodiment of the present invention includes subjecting a reaction gas containing metal chloride and an oxidizing gas containing no metal chloride in a reaction tube 11 to preheating, and then subjecting a combined gas composed of the reaction gas and the oxidizing gas to main heating in a main heating region A apart from the downstream side of the junction 5b, wherein the time until the combined gas from the junction 5b arrives at the upstream end A1 of the main heating region A is adjusted to less than 25 milliseconds. With such a construction, when a reaction gas containing a metal chloride and an oxidizing gas containing no metal chloride are each subjected to preheating, and then the combined gas is subjected to main heating, metal oxide particles with high photocatalytic activity can be produced by rapidly heating the combined gas.

In the method for producing metal oxide particles according to the embodiment of the present invention, the reaction tube 11 includes a double-tube structure portion 52 composed of a hollow outer cylinder 1 and a hollow inner cylinder 5 inserted into the upstream side of a hollow outer cylinder 1, and the reaction gas is allowed to flow into the hollow inner cylinder 5 and also the oxidizing gas is allowed to flow into a site between the hollow inner cylinder 5 and the hollow outer cylinder 1, thereby allowing the downstream end portion 5b of the hollow inner cylinder 5 to serve as the junction 5b of the reaction gas and the oxidizing gas. With such a construction, when a reaction gas containing metal oxide and an oxidizing gas containing no metal oxide are each subjected to preheating, combined in a reaction tube 11 to form a combined gas, and then the combined gas is subjected to main heating in the region apart from the downstream side of the junction 5b of the downstream end portion of the hollow inner cylinder 5, the combined gas is rapidly heated by adjusting the time until the combined gas from the junction 5b arrives at the upstream end A1 of the main heating region A to less than 25 milliseconds, thereby making it possible to produce metal oxide particles with high photocatalytic activity.

In the method for producing metal oxide particles according to the embodiment of the present invention, the metal chloride is titanium tetrachloride and the metal oxide particles are titanium oxide particles. With such a construction, when a reaction gas containing titanium tetrachloride and an oxidizing gas containing no titanium tetrachloride are each subjected to preheating, combined in a reaction tube 11 to form a combined gas, and then the combined gas is subjected to main heating in the region apart from the downstream side of the junction 5b, the combined gas is rapidly heated by adjusting the time until the combined gas from the junction 5b arrives at the upstream end A1 of the main heating region A to less than 25 milliseconds, thereby making it possible to produce titanium oxide particles with high photocatalytic activity.

In the method for producing metal oxide particles according to the embodiment of the present invention, the titanium oxide particles are decahedral titanium oxide particles. With such a construction, when a reaction gas containing titanium tetrachloride and an oxidizing gas containing no titanium tetrachloride are each subjected to preheating, combined in a reaction tube 11 to form a combined gas, and then the combined gas is subjected to main heating in the region apart from the downstream side of the junction 5b, the combined gas is rapidly heated by adjusting the time until the combined gas from the junction 5b arrives at the upstream end A1 of the main heating region A to less than 25 milliseconds, thereby making it possible to efficiently produce decahedral titanium oxide particles with high photocatalytic activity.

In the method for producing metal oxide particles according to the embodiment of the present invention, the preheating temperature is equal to or higher than 136° C. and lower than or equal to 750° C. With such a construction, metal oxide particles with high photocatalytic activity can be efficiently produced.

In the method for producing metal oxide particles according to the embodiment of the present invention, the main heating temperature is equal to or higher than 800° C. and lower than or equal to 1,500° C. With such a construction, metal oxide particles with high photocatalytic activity can be efficiently produced.

In the method for producing metal oxide particles according to the embodiment of the present invention, the reaction gas contains an oxygen gas and/or a nitrogen gas. With such a construction, metal oxide particles with high photocatalytic activity can be efficiently produced.

In the method for producing metal oxide particles according to the embodiment of the present invention, the oxidizing gas contains an oxygen gas, a nitrogen gas, argon, water vapor, or at least two kinds selected therefrom. With such a construction, metal oxide particles with high photocatalytic activity can be efficiently produced.

In the method for producing metal oxide particles according to the embodiment of the present invention, a linear velocity of the oxidizing gas is adjusted to be within a range of from 0.1 to 10 based on a linear velocity of the reaction gas on the upstream side of the downstream end portion 5b of the hollow inner cylinder 5. With such a construction, metal oxide particles with high photocatalytic activity can be efficiently produced.

In the method for producing metal oxide particles according to the embodiment of the present invention, the concentration of titanium tetrachloride contained in the combined gas is adjusted to be from 0.1 to 20% by volume on the downstream side of the downstream end portion 5b of the hollow inner cylinder 5. With such a construction, metal oxide particles with high photocatalytic activity can be efficiently produced.

In the method for producing metal oxide particles according to the embodiment of the present invention, the time during which the combined gas remains in the main heating region A is adjusted to be from 2 to 500 milliseconds. With such a construction, metal oxide particles with high photocatalytic activity can be efficiently produced.

In the method for producing metal oxide particles according to the embodiment of the present invention, the Reynolds number of the combined gas is adjusted to be from 10 to 10,000. With such a construction, metal oxide particles with high photocatalytic activity can be efficiently produced.

The apparatus 101 for producing metal oxide particles according to the embodiment of the present invention includes a reaction tube 11 through which a gas is allowed to flow from the upstream side to the downstream side; a second region 52 in which two or more gasses are allowed to separately flow, provided on the upstream side of the reaction tube 11; the junction 5b at which a combined gas composed of two or more gasses is formed, provided at the downstream end portion 5b of the second region 52; a first region 51 in which the combined gas is allowed to flow, provided on the downstream side of the junction 5b; and a main heating region A in which the combined gas is subjected to main heating, provided on the way of the first region 51; the apparatus 101 further comprising a control unit to control so that the time until the combined gas from the junction 5b arrives at the upstream end A1 of the main heating region A is adjusted to be less than 25 milliseconds. With such a construction, when a reaction gas containing metal oxide and an oxidizing gas containing no metal oxide are each subjected to preheating, combined in a reaction tube 11 to form a combined gas, and then the combined gas is subjected to main heating in the region apart from the downstream side of the junction 5b, the combined gas is rapidly heated by adjusting the time until the combined gas from the junction 5b arrives at the upstream end A1 of the main heating region A to less than 25 milliseconds, thereby making it possible to produce metal oxide particles with high photocatalytic activity.

In the apparatus 101 for producing metal oxide particles according to the embodiment of the present invention, the control unit includes means for controlling a flow rate of the combined gas. With such a construction, when a reaction gas containing metal oxide and an oxidizing gas containing no metal oxide are each subjected to preheating, and are combined in a reaction tube 11 to form a combined gas, and then the combined gas is subjected to main heating in the region apart from the downstream side of the junction 5b, the combined gas is rapidly heated by controlling the flow rate of the combined gas to adjust the time until the combined gas from the junction 5b arrives at the upstream end A1 of the main heating region A to less than 25 milliseconds, thereby making it possible to produce metal oxide particles with high photocatalytic activity.

In the apparatus for producing metal oxide particles according to the embodiment of the present invention, a heat shield plate 10 is provided outside the reaction tube 11, between the second region 52 and the main heating region A. With such a construction, when a reaction gas containing metal chloride and an oxidizing gas containing no metal chloride are each subjected to preheating, infrared rays from the downstream side of a heating device 2 can be shielded, and infrared rays from the upstream side of a heating device 2 can be shielded when the combined gas is subjected to main heating, and thus metal oxide particles with high photocatalytic activity can be produced by accurately controlling a preheating temperature and a main heating temperature.

EXAMPLES

The present invention will be described specifically by way of Examples. However, the present invention is not limited only to the Examples and other modifications can be appropriately made without departing from the scope of the present invention.

Example 1

Preparation of Apparatus

First, a reaction tube 11 having a double-tube structure was produced using a quartz tube having an outer diameter of 25.1 mm, an inner diameter of 21.1 mm and a thickness of 2.0 mm as a hollow outer cylinder 1; and a quartz tube having an outer diameter of 12.0 mm, an inner diameter of 7.9 mm and a thickness of 2.1 mm as a hollow inner cylinder 5 by arranging the hollow outer cylinder 1 and the hollow inner cylinder 5 to be aligned along the same axis.

Next, the main heating region A was set in such a manner that a platinum plate of 12 cm was wound around a part of the reaction tube 11, and a heating device (infrared gold image furnaces, manufactured by ULVAC-RIKO, Inc.) 2 was disposed so as to irradiate infrared rays to the wound portion.

Next, the hollow inner cylinder 5 was disposed so that the downstream end portion 5b of the hollow inner cylinder 5 was disposed at a position 1 cm on the upstream side of the upstream end of the main heating region A. The main heating region B was set in such a manner that a platinum plate of 12 cm was wound on the upstream side of the downstream end portion 5b of the hollow inner cylinder 5, and a heating device 2 was disposed so as to irradiate infrared rays to the wound portion.

Next, a temperature controller (not shown) was disposed in the main heating region A and the preheating region B.

Next, an electric heater was disposed on the upstream side of the heating device 2, and preheating regions X, Y in which a reaction gas and an oxidizing gas are preheated were set.

Next, the length of a middle region Z was set at 1 (cm). This length is the length which sets a transfer time at 21 (milliseconds) when the flow rate of the combined gas is about 0.047 (cm/millisecond).

Thus, the apparatus 101 for producing metal oxide particles shown in FIG. 1 was prepared as described above.

Production Process

Next, an oxidizing gas composed of oxygen ($O_2$) gas was introduced into an oxidizing gas introducing tube 4a, passed through a vaporizer 6 maintained at 165° C., and then the oxidizing gas was introduced into the oxidizing gas introducing tube 4. The flow rate of the oxidizing gas was set at 1,657 Nml/min.

Next, titanium tetrachloride ($TiCl_4$) introduced through a reaction gas introducing tube 25a was converted into titanium tetrachloride vapor by passing through a vaporizer 7 maintained at 165° C., and oxygen ($O_2$) was introduced through a reaction gas introducing tube 25b, and then a reaction gas composed of a mixed gas of a titanium tetrachloride vapor and oxygen was introduced into a hollow inner cylinder 5. The flow rate of the reaction gas was set at 343 Nml/min.

In the preheating regions X, Y, the reaction gas and the oxidizing gas were respectively heated to 150° C.

Also, the reaction gas and the oxidizing gas were preheated to 700° C. by controlling so that a surface temperature of a platinum plate of a preheating region B becomes 700° C.

Furthermore, a ratio of the linear velocity of the oxidizing gas to the linear velocity of the reaction gas in the preheating region B was set at 1.0.

In the middle region Z, the preheated reaction gas and oxidizing gas were combined and then the combined gas was transferred to the main heating region A after 21 milliseconds.

The temperature of the middle region Z was from 700 to 1,100° C.

Next, the combined gas was heated to 1,100° C. by controlling so that the surface temperature of the platinum plate in the main heating region A becomes 1,100° C. The residence time of the combined gas in the main heating region A was set at 250 milliseconds. The concentration of titanium tetrachloride in the combined gas in the main reaction zone A was adjusted to 0.24% by volume. The Reynolds number of the combined gas in the main heating region A was 47.

This Reynolds number is the value obtainable under an assumption that the combined gas in the downstream side of the downstream end portion 5b of the hollow inner cylinder 5 has reached 1,100° C. Furthermore, the residence time is the value obtainable under an assumption that the combined gas in the downstream side of the downstream end portion 5b of the hollow inner cylinder 5 has reached 1,100° C.

Finally, the metal oxide particles (Example 1) formed from a powder product were recovered at the product recovery unit 3.

Evaluation of Characteristics

The characteristics of the metal oxide particles (Example 1) were evaluated as described below.

First, the yield of the powder product with respect to the raw materials was 81%. The powder products thus obtained were titanium oxide particles.

The term "yield of the powder product" is the mass ratio of the powder product produced, that is, titanium oxide particles, relative to the mass of the titanium oxide product obtainable in the case where the entire amount of the titanium tetrachloride used was converted to the titanium oxide product by the reaction of the above-mentioned reaction scheme (1).

For reference, the term "yield of the film-like product" is the mass ratio of the film-like product produced relative to the mass of the titanium oxide product obtainable in the case where the entire amount of the titanium tetrachloride used was converted to the titanium oxide product by the reaction of the above-mentioned reaction scheme (1).

Next, the titanium oxide particles were observed by a scanning electron microscope, and it was found that the proportion of decahedral titanium oxide in the powder product is 70%.

The proportion of decahedral titanium oxide particles (hereinafter, referred to as "decahedral proportion") is a value obtained by counting the number of titanium oxide particles (powder product that has been arbitrarily sampled) at five or more visual fields under an observation with a scanning electron microscope, and calculating the proportion of decahedral titanium oxide particles relative to the titanium oxide particles.

Furthermore, it was found that the specific surface area (BET) of the obtained particles is 25 $m^2/g$.

Next, it was found by an X-ray diffraction analysis that the proportion of rutile is 1%.

This proportion of rutile is a result obtained by estimating the proportion (%) of titanium oxide particles having a rutile-type crystal structure, from the peak intensity obtained by an X-ray diffraction analysis. The method for estimation of the proportion of rutile was described in FIG. 4. The photocatalytic activity of decahedral titanium oxide particles has a correlation with the proportion of rutile and, there is a tendency that particles having low proportion of rutile exhibit higher photocatalytic activity than that of particles having high proportion of rutile when the specific surface area is the same. In particular, decahedral titanium oxide particles having the proportion of rutile of 1% or less exhibit high photocatalytic activity.

Next, it was found by using the below-mentioned gas chromatographic method that the photocatalytic activity is 128 ppm/h.

First, 10 mg of a titanium oxide powder was placed in a petri dish having an inner diameter of 27 mm, water was added thereto to disperse the titanium oxide powder, and then the dispersion was dried at 110° C.

Next, this petri dish was placed in a 500 ml chamber, and the chamber was purged with synthetic air. Then, acetaldehyde in an amount equivalent to 500 ppm and 5.8 μl of water (amount equivalent to a relative humidity of 50% at 25° C.) were added to the petri dish, and the content of the petri dish was irradiated with light from a xenon light source at an intensity of 0.2 mW/cm$^2$. Then, the amount of carbon dioxide ($CO_2$) generated per one hour was quantified by gas chromatography.

Example 2

Metal oxide particles of Example 2 were produced in the same manner as in Example 1, except that the concentration of titanium tetrachloride in the combined gas in the main heating region A was set at 0.48% by volume.

The yield of the powder product relative to the raw materials was 93%. Furthermore, it was found that the proportion of decahedral titanium oxide in the powder product was 80%. The photocatalytic activity was 129 ppm/h. The specific surface area of the obtained particles was 20 m$^2$/g. In addition, the proportion of rutile was 1%.

Example 3

Metal oxide particles of Example 3 were produced in the same manner as in Example 1, except that the concentration of titanium tetrachloride in the combined gas in the main heating region A was set at 0.73% by volume.

The yield of the powder product relative to the raw materials was 85%. Furthermore, it was found that the proportion of decahedral titanium oxide in the powder product was 70%. The photocatalytic activity was 122 ppm/h. The specific surface area of the obtained particles was 18 m$^2$/g. In addition, the proportion of rutile was 1%.

Example 4

Metal oxide particles of Example 4 were produced in the same manner as in Example 1, except that the concentration of titanium tetrachloride in the combined gas in the main heating region A was set at 0.18% by volume.

The yield of the powder product relative to the raw materials was 88%. Furthermore, it was found that the proportion of decahedral titanium oxide in the powder product was 70%. The photocatalytic activity was 112 ppm/h. The specific surface area of the obtained particles was 26 m$^2$/g. In addition, the proportion of rutile was 1%.

Example 5

Metal oxide particles of Example 5 were produced in the same manner as in Example 1, except that the concentration of titanium tetrachloride in the combined gas in the main heating region A was set at 0.48% by volume, a quartz tube having an outer diameter of 12.7 mm, an inner diameter of 10.3 mm and a thickness of 1.2 mm was used as a hollow inner cylinder 5, the flow rate of the oxidizing gas was set at 1,211 Nml/min., the flow rate of the reaction gas was set at 457 Nml/min., the residence time of the combined gas in the main heating region A was set at 289 milliseconds, the transfer time was set at 24 milliseconds, the Reynolds number in the main heating region A was set at 38, and the main heating temperature was set at 1,150° C.

This Reynolds number is the value obtainable under an assumption that the combined gas in the downstream side of the downstream end portion 5b of the hollow inner cylinder 5 has reached 1,150° C. This residence time is the value obtainable under an assumption that the combined gas in the downstream side of the downstream end portion 5b of the hollow inner cylinder 5 has reached 1,150° C.

The yield of the powder product relative to the raw materials was 85%. Furthermore, it was found that the proportion of decahedral titanium oxide in the powder product was 70%. The photocatalytic activity was 125 ppm/h. The specific surface area of the obtained particles was 20 m$^2$/g. In addition, the proportion of rutile of the metal oxide particles (titanium oxide particles) of Example 5 was 1%.

Example 6

Metal oxide particles of Example 6 were produced in the same manner as in Example 5, except that the flow rate of the oxidizing gas was set at 1,320 Nml/min., the flow rate of the reaction gas was set at 498 Nml/min., the Reynolds number in the main heating region A was set at 41, the residence time of the combined gas in the main heating region A was set at 265 milliseconds, and the transfer time was set at 22 milliseconds.

This Reynolds number is the value obtainable under an assumption that the combined gas in the downstream side of the downstream end portion 5b of the hollow inner cylinder 5 has reached 1,150° C. This residence time is the value obtainable under an assumption that the combined gas in the downstream side of the downstream end portion 5b of the hollow inner cylinder 5 has reached 1,150° C.

The yield of the powder product relative to the raw materials was 83%. Furthermore, it was found that the proportion of decahedral titanium oxide in the powder product was 70%. The photocatalytic activity was 131 ppm/h. The specific surface area of the obtained particles was 20 m$^2$/g. In addition, the proportion of rutile was 1%.

Example 7

Metal oxide particles of Example 7 were produced in the same manner as in Example 5, except that the concentration of titanium tetrachloride in the combined gas in the main heating region A was set at 0.48% by volume, a quartz tube having an outer diameter of 12.7 mm, an inner diameter of 10.3 mm and a thickness of 1.2 mm was used as the hollow inner cylinder 5, the flow rate of the oxidizing gas was set at 1,398 Nml/min., the flow rate of the reaction gas was set at 527 Nml/min., the Reynolds number in the main heating region A was set at 44, and the main heating temperature was set at 1,150° C.

This Reynolds number is the value obtainable under an assumption that the combined gas in the downstream side of the downstream end portion 5b of the hollow inner cylinder 5 has reached 1,150° C. This residence time is the value obtainable under an assumption that the combined gas in the downstream side of the downstream end portion 5b of the hollow inner cylinder 5 has reached 1,150° C.

The yield of the powder product relative to the raw materials was 83%. Furthermore, it was found that the proportion of decahedral titanium oxide in the powder product was 70%. The photocatalytic activity was 137 ppm/h. The specific surface area of the obtained particles was 20 m²/g.

Figure 4:
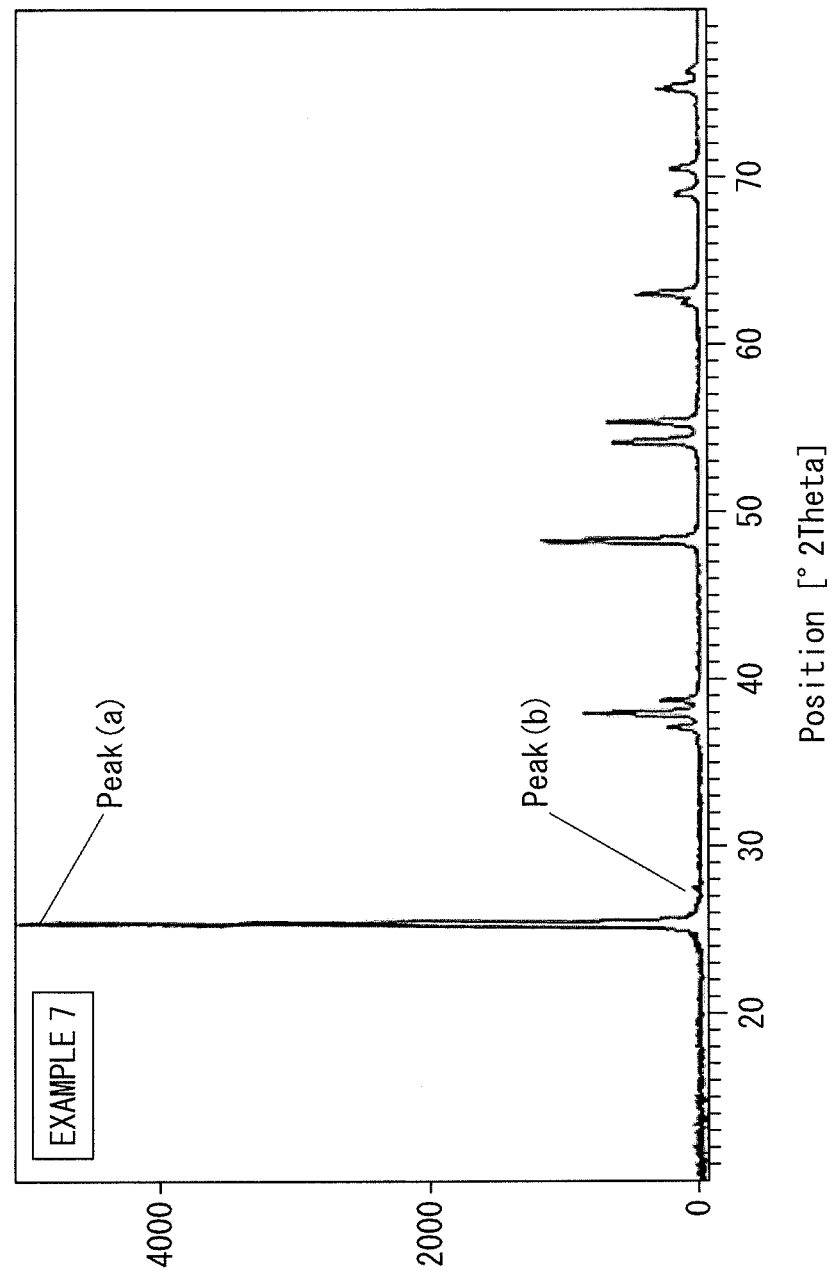
FIG. 4 shows the results of X-ray diffraction analysis of metal oxide particles (titanium oxide particles) of Example 7.

FIG. 4 shows X-ray diffraction analytical results of metal oxide particles (titanium oxide particles) of Example 7. Using a peak (a) strength and a peak (b) intensity of FIG. 4, estimation was carried out by the following equation (2).

$$\text{Proportion of rutile (\%)} = 100 \times (\text{peak } (b) \text{ intensity})/(\text{peak } (a) \text{ intensity} + \text{peak } (b) \text{ intensity}) \quad (2)$$

The proportion of rutile of metal oxide particles (titanium oxide particles) of Example 7 was 1%.

Figure 3A:
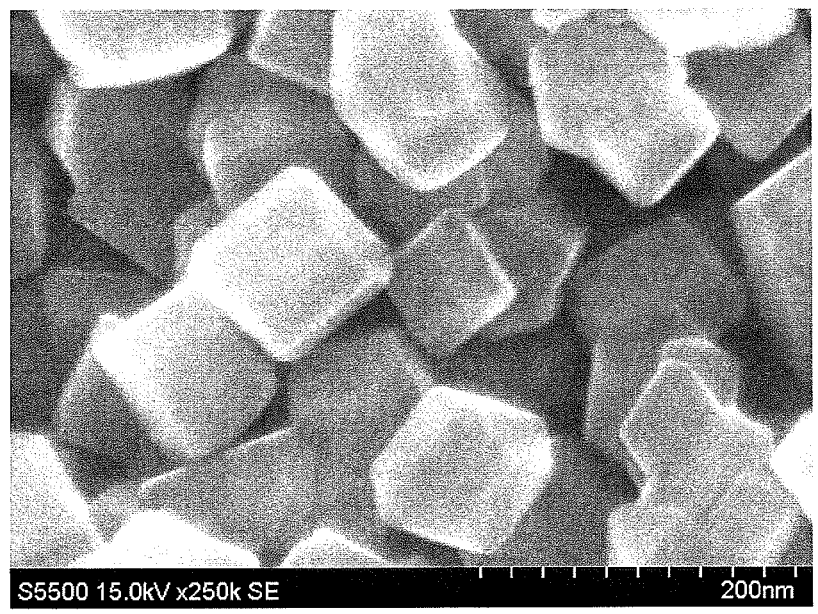
FIG. 3A is a scanning electron microscope photograph (magnification of 250k times) of metal oxide particles (titanium oxide particles) of Example 7.
Figure 3B:
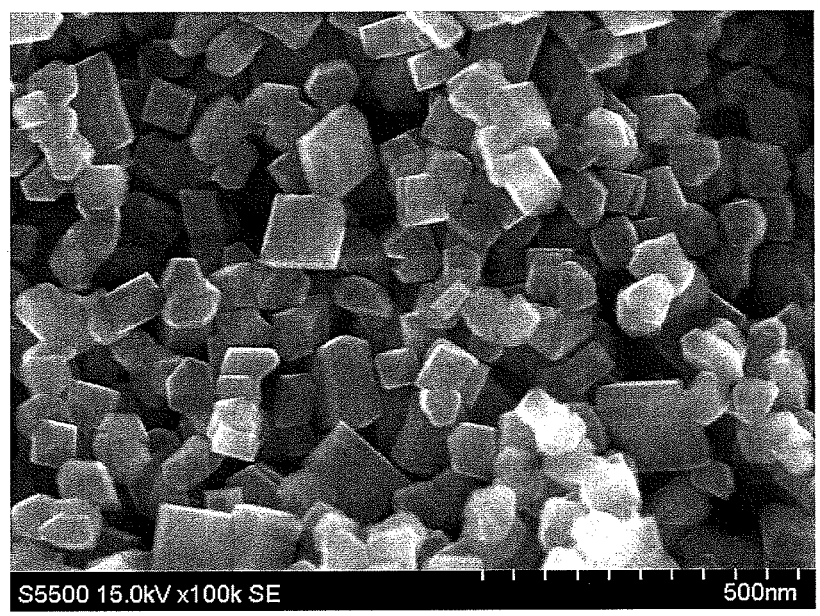
FIG. 3B is a photograph (magnification of 100k times) of the metal oxide particles of FIG. 3A.

FIGS. 3A and 3B are scanning electron microscopic photograph of metal oxide particles (titanium oxide particles) of Example 7, in which FIG. 3A is a photograph (magnification of 250k times) and FIG. 3B is a photograph (magnification of 100k times).

Example 8

Metal oxide particles of Example 8 were produced in the same manner as in Example 5, except that the flow rate of the oxidizing gas was set at 2,795 Nml/min., the flow rate of the reaction gas was set at 1,055 Nml/min., the Reynolds number in the main heating region A was set at 88, the residence time of the combined gas in the main heating region A was set at 125 milliseconds, and the transfer time was set at 10 milliseconds.

This Reynolds number is the value obtainable under an assumption that the combined gas in the downstream side of the downstream end portion 5b of the hollow inner cylinder 5 has reached 1,150° C. This residence time is the value obtainable under an assumption that the combined gas in the downstream side of the downstream end portion 5b of the hollow inner cylinder 5 has reached 1,150° C.

The yield of the powder product relative to the raw materials was 73%. Furthermore, it was found that the proportion of decahedral titanium oxide in the powder product was 80%. The photocatalytic activity was 146 ppm/h. The specific surface area of the obtained particles was 25 m²/g. In addition, the proportion of rutile was 0%.

Example 9

Metal oxide particles of Example 9 were produced in the same manner as in Example 5, except that the flow rate of the oxidizing gas was set at 3,494 Nml/min., the flow rate of the reaction gas was set at 1,318 Nml/min., the Reynolds number in the main heating region A was set at 110, the residence time of the combined gas in the main heating region A was set at 100 milliseconds, and the transfer time was set at 8 milliseconds.

This Reynolds number is the value obtainable under an assumption that the combined gas in the downstream side of the downstream end portion 5b of the hollow inner cylinder 5 has reached 1,150° C. This residence time is the value obtainable under an assumption that the combined gas in the downstream side of the downstream end portion 5b of the hollow inner cylinder has reached 1,150° C.

The yield of the powder product relative to the raw materials was 34%. Furthermore, it was found that the proportion of decahedral titanium oxide in the powder product was 60%. The photocatalytic activity was 149 ppm/h. The specific surface area of the obtained particles was 41 m²/g. In addition, the proportion of rutile was 0%.

Example 10

Metal oxide particles of Example 10 were produced in the same manner as in Example 5, except that the flow rate of the oxidizing gas was set at 1,510 Nml/min., the flow rate of the reaction gas was set at 570 Nml/min., the Reynolds number in the main heating region A was set at 50, and the main heating temperature was set at 1,050° C.

This Reynolds number is the value obtainable under an assumption that the combined gas in the downstream side of the downstream end portion 5b of the hollow inner cylinder 5 has reached 1,050° C. This residence time is the value obtainable under an assumption that the combined gas in the downstream side of the downstream end portion 5b of the hollow inner cylinder 5 has reached 1,050° C.

The yield of the powder product relative to the raw materials was 56%. Furthermore, it was found that the proportion of decahedral titanium oxide in the powder product was 70%. The photocatalytic activity was 142 ppm/h. The specific surface area of the obtained particles was 28 m²/g. In addition, the proportion of rutile was 0%.

Example 11

Metal oxide particles of Example 11 were produced in the same manner as in Example 5, except that the flow rate of the oxidizing gas was set at 1,568 Nml/min., the flow rate of the reaction gas was set at 592 Nml/min., the Reynolds number in the main heating region A was set at 54, and the main heating temperature was set at 1,000° C.

This Reynolds number is the value obtainable under an assumption that the combined gas in the downstream side of the downstream end portion 5b of the hollow inner cylinder 5 has reached 1,000° C. This residence time is the value obtainable under an assumption that the combined gas in the downstream side of the downstream end portion 5b of the hollow inner cylinder 5 has reached 1,000° C.

The yield of the powder product relative to the raw materials was 45%. Furthermore, it was found that the proportion of decahedral titanium oxide in the powder product was 70%. The photocatalytic activity was 163 ppm/h. The specific surface area of the obtained particles was 24 m²/g. In addition, the proportion of rutile was 0%.

Example 12

Metal oxide particles of Example 12 were produced in the same manner as in Example 9, except that the distance of the middle region Z was set at 2.5 cm and the transfer time was set at 20 milliseconds.

The yield of the powder product relative to the raw materials was 35%. Furthermore, it was found that the proportion of decahedral titanium oxide in the powder product was 60%. The photocatalytic activity was 145 ppm/h. The specific surface area of the obtained particles was 40 m²/g. In addition, the proportion of rutile was 0%.

Example 13

Figure 2:
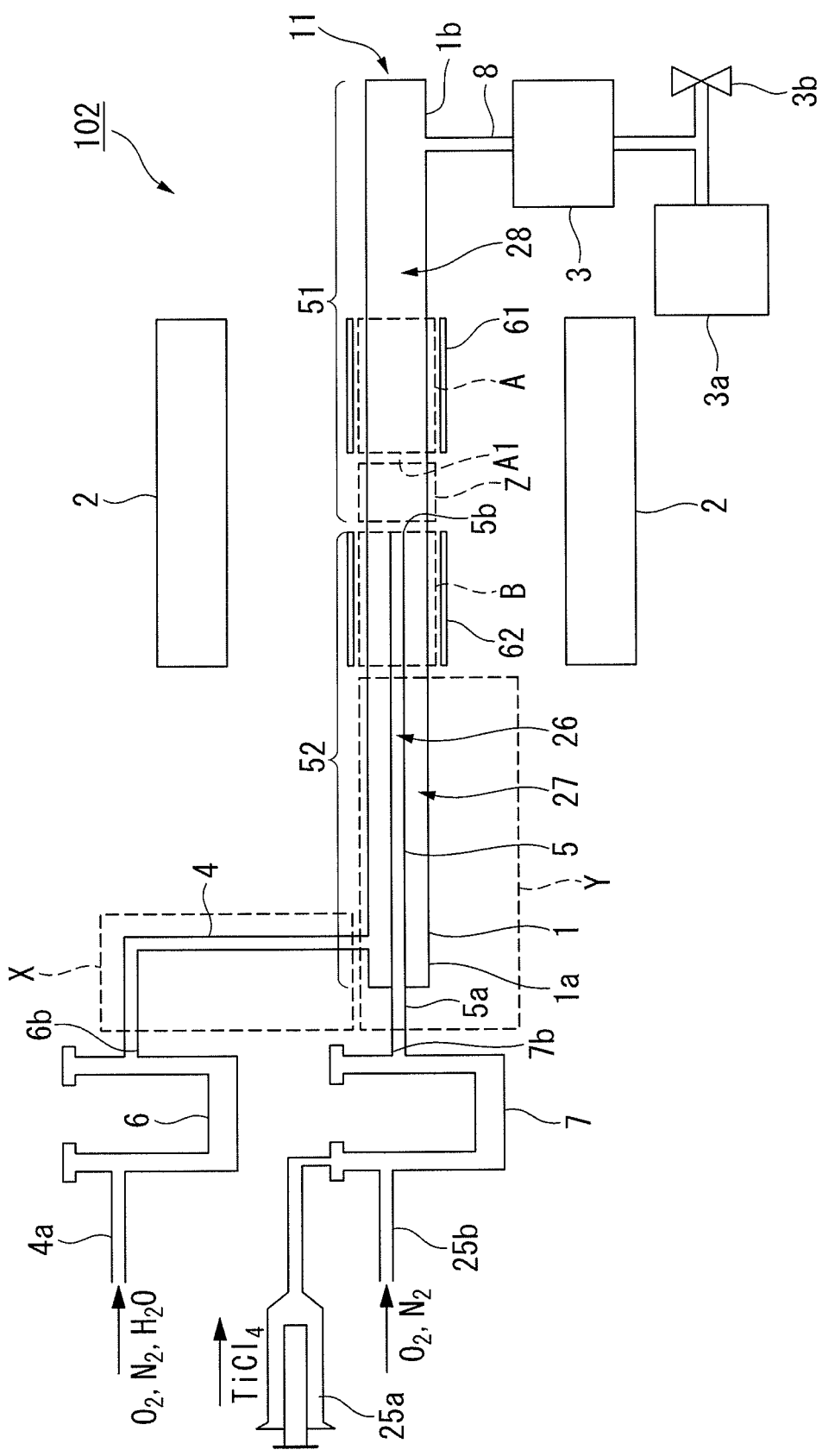
FIG. 2 is a schematic view showing Comparative Example of the apparatus for producing metal oxide particles.

Using an apparatus 102 for producing metal oxide particles shown in FIG. 2, metal oxide particles of Example 13 were produced. The production apparatus 102 has the same construction as that of the production apparatus 101, except that no light shield plate 10 was used. The same member and region are designated by the same reference symbol.

Metal oxide particles of Example 13 were produced in the same manner as in Example 9, except that the production apparatus 102 was used, the length of the middle region Z was set at 2.5 cm, and the transfer time was set at 20 milliseconds.

The yield of the powder product relative to the raw materials was 37%. Furthermore, it was found that the proportion of decahedral titanium oxide in the powder product was 50%. The photocatalytic activity was 125 ppm/h. The specific surface area of the obtained particles was 40 m$^2$/g. In addition, the proportion of rutile was 1%.

Comparative Example 1

FIG. 2 is a schematic view showing Comparative Example of an apparatus for producing metal oxide particles. The production apparatus 102 of Comparative Example has the same construction as that of the production apparatus 101, except that no light shield plate 10 was used and the length of the middle region Z was set at 6 cm. The same member and region are designated by the same reference symbol.

Metal oxide particles of Comparative Example 1 were produced in the same manner as in Example 1, except that the production apparatus 102 was used. The transfer time is 126 milliseconds.

The yield of the powder product relative to the raw materials was 70%. Furthermore, it was found that the proportion of decahedral titanium oxide in the powder product was 50%. The photocatalytic activity was 90 ppm/h. The BET specific surface area was 23 m$^2$/g. In addition, the proportion of rutile was 2%.

Comparative Example 2

Metal oxide particles of Comparative Example 2 were produced in the same manner as in Example 5, except that the flow rate of the oxidizing gas was set at 1,165 Nml/min., the flow rate of the reaction gas was set at 440 Nml/min., the Reynolds number in the main heating region A was set at 37, the residence time of the combined gas in the main heating region A was set at 300 milliseconds, and the transfer time was set at 25 milliseconds.

This Reynolds number is the value obtainable under an assumption that the combined gas in the downstream side of the downstream end portion 5b of the hollow inner cylinder 5 has reached 1,150° C. This residence time is the value obtainable under an assumption that the combined gas in the downstream side of the downstream end portion 5b of the hollow inner cylinder 5 has reached 1,150° C.

The yield of the powder product relative to the raw materials was 85%. Furthermore, it was found that the proportion of decahedral titanium oxide in the powder product was 50%. The photocatalytic activity was 103 ppm/h. The specific surface area of the obtained particles was 19 m$^2$/g. In addition, the proportion of rutile was 2%.

Comparative Example 3

Metal oxide particles of Comparative Example 3 were produced in the same manner as in Example 1, except that the concentration of titanium tetrachloride in the combined gas in the main heating region A was set at 0.48% by volume, a quartz tube having an outer diameter of 12.7 mm, an inner diameter of 10.3 mm and a thickness of 1.2 mm was used as the hollow inner cylinder 5, the flow rate of the oxidizing gas was set at 1,118 Nml/min., the flow rate of the reaction gas was set at 422 Nml/min., the residence time of the combined gas in the main heating region A was set at 313 milliseconds, the transfer time was set at 26 milliseconds, the Reynolds number in the main heating region A was set at 35, and the main heating temperature was set at 1,150° C.

This Reynolds number is the value obtainable under an assumption that the combined gas in the downstream side of the downstream end portion 5b of the hollow inner cylinder 5 has reached 1,150° C. This residence time is the value obtainable under an assumption that the combined gas in the downstream side of the downstream end portion 5b of the hollow inner cylinder 5 has reached 1,150° C.

The yield of the powder product relative to the raw materials was 85%. Furthermore, it was found that the proportion of decahedral titanium oxide in the powder product was 50%. The photocatalytic activity was 108 ppm/h. The specific surface area of the obtained particles was 19 m$^2$/g. In addition, the proportion of rutile of metal oxide particles (titanium oxide particles) of Comparative Example 3 was 2%.

Comparative Example 4

For comparison of characteristics, commercially available titanium oxide particles for photocatalyst were purchased. The titanium oxide particles (Comparative Example 4) are particles synthesized by a flame method and observed by an electron microscope. As a result, the titanium oxide particles had an amorphous particle shape and a primary particle size of 20 to 60 nm. The results of X-ray diffraction analysis revealed that the titanium oxide particles are particles in which anatase and rutile coexist.

The proportion of decahedral titanium oxide of titanium oxide particles (Comparative Example 4) was 0% and the photocatalytic activity was 70 ppm/h. The specific surface area of the particles was 50 m$^2$/g.

Production conditions of Examples 1 to 11 and Comparative Examples 1 to 3 are summarized in Table 1.

TABLE 1

| | Production apparatus | | Inner cylinder Inner diameter (mm) | Concentration of titanium tetrachloride in downstream of downstream end portion of inner cylinder (vol %) | Residence time (milliseconds) | Ratio of linear velocity between outside and inside of inner cylinder | Distance of middle region Z (cm) | Transfer time (milliseconds) |
|---|---|---|---|---|---|---|---|---|
| | Structure | Light shield plate | | | | | | |
| Example 1 | FIG. 1 | Existence | 7.9 | 0.24% | 250 | Outside/Inside = 1/1 | 1 | 21 |
| Example 2 | FIG. 1 | Existence | 7.9 | 0.48% | 250 | Outside/Inside = 1/1 | 1 | 21 |

TABLE 1-continued

| | | | | | | | | |
|---|---|---|---|---|---|---|---|---|
| Example 3 | FIG. 1 | Existence | 7.9 | 0.73% | 250 | Outside/Inside = 1/1 | 1 | 21 |
| Example 4 | FIG. 1 | Existence | 7.9 | 0.18% | 250 | Outside/Inside = 1/1 | 1 | 21 |
| Example 5 | FIG. 1 | Existence | 10.3 | 0.48% | 289 | Outside/Inside = 1/1 | 1 | 24 |
| Example 6 | FIG. 1 | Existence | 10.3 | 0.48% | 265 | Outside/Inside = 1/1 | 1 | 22 |
| Example 7 | FIG. 1 | Existence | 10.3 | 0.48% | 250 | Outside/Inside = 1/1 | 1 | 21 |
| Example 8 | FIG. 1 | Existence | 10.3 | 0.48% | 125 | Outside/Inside = 1/1 | 1 | 10 |
| Example 9 | FIG. 1 | Existence | 10.3 | 0.48% | 100 | Outside/Inside = 1/1 | 1 | 8 |
| Example 10 | FIG. 1 | Existence | 10.3 | 0.48% | 250 | Outside/Inside = 1/1 | 1 | 21 |
| Example 11 | FIG. 1 | Existence | 10.3 | 0.48% | 250 | Outside/Inside = 1/1 | 1 | 21 |
| Comparative Example 1 | FIG. 2 | None | 7.9 | 0.24% | 250 | Outside/Inside = 1/1 | 6 | 126 |
| Comparative Example 2 | FIG. 1 | Existence | 10.3 | 0.48% | 300 | Outside/Inside = 1/1 | 1 | 25 |
| Comparative Example 3 | FIG. 1 | Existence | 10.3 | 0.48% | 313 | Outside/Inside = 1/1 | 1 | 26 |

| | Temperature (° C.) | | | | Reaction gas | | Oxidizing gas | | |
|---|---|---|---|---|---|---|---|---|---|
| | Preheating Temperature | | | Temperature of middle region | Main heating temperature | | | | |
| | Preheating region X | Preheating region Y | Preheating region B | | | Kind | Flow rate (Nml/min.) | Kind | Flow rate (Nml/min.) | Reynolds number |
| Example 1 | 150 | 150 | 700 | 700-1,100 | 1,100 | Titanium tetrachloride, Oxygen | 343 | Oxygen | 1,657 | 47 |
| Example 2 | 150 | 150 | 700 | 700-1,100 | 1,100 | Titanium tetrachloride, Oxygen | 343 | Oxygen | 1,657 | 47 |
| Example 3 | 150 | 150 | 700 | 700-1,100 | 1,100 | Titanium tetrachloride, Oxygen | 343 | Oxygen | 1,657 | 47 |
| Example 4 | 150 | 150 | 700 | 700-1,100 | 1,100 | Titanium tetrachloride, Oxygen | 343 | Oxygen | 1,657 | 47 |
| Example 5 | 150 | 150 | 700 | 700-1,150 | 1,150 | Titanium tetrachloride, Oxygen | 457 | Oxygen | 1,211 | 38 |
| Example 6 | 150 | 150 | 700 | 700-1,150 | 1,150 | Titanium tetrachloride, Oxygen | 498 | Oxygen | 1,320 | 41 |
| Example 7 | 150 | 150 | 700 | 700-1,150 | 1,150 | Titanium tetrachloride, Oxygen | 527 | Oxygen | 1,398 | 44 |
| Example 8 | 150 | 150 | 700 | 700-1,150 | 1,150 | Titanium tetrachloride, Oxygen | 1,055 | Oxygen | 2,795 | 88 |
| Example 9 | 150 | 150 | 700 | 700-1,150 | 1,150 | Titanium tetrachloride, Oxygen | 1,318 | Oxygen | 3,494 | 110 |
| Example 10 | 150 | 150 | 700 | 700-1,050 | 1,050 | Titanium tetrachloride, Oxygen | 570 | Oxygen | 1,510 | 50 |
| Example 11 | 150 | 150 | 700 | 700-1,000 | 1,000 | Titanium tetrachloride, Oxygen | 592 | Oxygen | 1,568 | 54 |
| Comparative Example 1 | 150 | 150 | 700 | 700-1,100 | 1,100 | Titanium tetrachloride, Oxygen | 343 | Oxygen | 1,657 | 47 |
| Comparative Example 2 | 150 | 150 | 700 | 700-1,150 | 1,150 | Titanium tetrachloride, Oxygen | 440 | Oxygen | 1,165 | 37 |
| Comparative Example 3 | 150 | 150 | 700 | 700-1,150 | 1,150 | Titanium tetrachloride, Oxygen | 422 | Oxygen | 1,118 | 35 |

For each of Examples 1 to 13 and Comparative Examples 1 to 4, yields of the powder products, proportions of decahedron in the powder products, photocatalytic activities, specific surface areas (BET measured values, m²/g), proportions of rutile are summarized in Table 2.

TABLE 2

| | Yield (%) of powder product | Proportion (%) of decahedron | Photocatalytic activity $CO_2$ formation rate (ppm/h) | BET (m²/g) | Proportion of rutile |
|---|---|---|---|---|---|
| Example 1 | 81 | 70 | 128 | 25 | 1% |
| Example 2 | 93 | 80 | 129 | 20 | 1% |
| Example 3 | 85 | 70 | 122 | 18 | 1% |
| Example 4 | 88 | 70 | 112 | 26 | 1% |
| Example 5 | 85 | 70 | 125 | 20 | 1% |
| Example 6 | 83 | 70 | 131 | 20 | 1% |
| Example 7 | 83 | 70 | 137 | 20 | 1% |
| Example 8 | 73 | 80 | 146 | 25 | 0% |
| Example 9 | 34 | 60 | 149 | 41 | 0% |
| Example 10 | 56 | 70 | 142 | 28 | 0% |

TABLE 2-continued

| | Yield (%) of powder product | Proportion (%) of decahedron | Photocatalytic activity CO$_2$ formation rate (ppm/h) | BET (m$^2$/g) | Proportion of rutile |
|---|---|---|---|---|---|
| Example 11 | 45 | 70 | 163 | 24 | 0% |
| Comparative Example 1 | 70 | 50 | 90 | 23 | 2% |
| Comparative Example 2 | 85 | 50 | 103 | 19 | 2% |
| Comparative Example 3 | 85 | 50 | 108 | 19 | 2% |
| Comparative Example 4 | — | 0 | 70 | 50 | — |

The photocatalytic activity of 90 ppm/h of titanium oxide particles of Comparative Example 1 in which the transfer time was adjusted to 126 milliseconds was slightly higher than the photocatalytic activity of 70 ppm/h of commercially available particles of Comparative Example 3.

The photocatalytic activity of titanium oxide particles of Comparative Example 2 in which the transfer time was set at 25 milliseconds was 103 ppm/h and was slightly improved as compared with the photocatalytic activity of titanium oxide particles of Comparative Example 1.

In contrast, the photocatalytic activity of titanium oxide particles of Examples 5 to 9 in which the transfer time was set at less than 25 milliseconds was from 125 to 149 ppm/h and was remarkably improved.

As is apparent from Examples 5 to 9, the transfer time is preferably less than 25 milliseconds, more preferably less than 23 milliseconds, and still more preferably less than 22 milliseconds, so as to obtain high photocatalytic activity.

In the titanium oxide particles of Example 1 to 4 in which a comparison of characteristics was made by varying the concentration of titanium tetrachloride in the downstream side of the downstream end portion 5b within a range from of 0.18 to 0.73%, a high photocatalytic activity of 112 to 129 ppm/h was obtained.

In Examples 5 to 9, the transfer time is changed within a range of from 8 to 24 milliseconds and also the residence time is changed within a range of from 100 to 289 milliseconds.

A change in characteristics of particles during changes in the residence time is a change in BET value. As the residence time is shortened, the BET value tends to increase. In general, as the BET value increases, the activity of titanium oxide particles increases.

In Examples 5 to 7, the residence time is shortened within a range of from 289 milliseconds to 250 milliseconds. Within this residence time range, the specific surface area is the same as 20 m$^2$/g. Therefore, the reason why the activity increases in Examples 5 to 7 is not due to a change in the residence time, but a shortening of the transfer time.

In Examples 7 to 9, the residence time is shortened within a range of from 250 milliseconds to 125 milliseconds and 100 milliseconds. The yield of the powder decreased from 83% to 34%. However, since the BET value increased from 20 m$^2$/g to 41 m$^2$/g, the photocatalytic activity increased to 149 ppm/h.

In titanium oxide particles of Examples 7, 10 and 11 in which characteristics were compared by changing the temperature of the main heating region A, the photocatalytic activity increased to about 163 ppm/h when the main heating temperature was decreased from 1,150° C. to 1,000° C., but the yield of the powder product decreased to 45%.

While the apparatus 101 with a light shield plate is used in Example 12, the apparatus 102 without a light shield plate is used in Example 13. In case of no light shield plate in Example 13, decahedral proportion and the photocatalytic activity are slightly decreased as compared with Example 12.

INDUSTRIAL APPLICABILITY

The present invention relates to a method for producing metal oxide particles and a production apparatus therefor, and particularly to a method for producing metal oxide particles, in which decahedral titanium oxide particles suited for use as a photocatalytic material, or other titanium oxide particles are produced by rapidly heating a combined gas composed of a reaction gas containing titanium tetrachloride and an oxidizing gas, and a production apparatus therefor, and is applicable in photocatalytic industry or the like.

REFERENCE SIGNS LIST

1 Hollow outer cylinder
1a Upstream side
1b Downstream side
2 Heating device (Infrared gold image furnace)
3 Product recovery unit
3a Exhaust pump
3b Pressure regulating valve
4, 4a Oxidizing gas introducing tube
5 Hollow inner cylinder
5a Upstream side
5b Downstream side (Downstream end portion: Downstream end: Junction)
6, 7 Vaporizer
8 Discharge tube
10 Light shield plate
11 Reaction tube
25a, 25b Reaction gas introducing tube
26 Opening of inner cylinder
27 Ring-shaped opening
28 Opening of outer cylinder
51 First region (Single-tube structure portion)
52 Second region (Double-tube structure portion)
61, 62 Platinum plate
101, 102 Apparatus for producing metal oxide particles
A Main heating region
A1 Upstream end
B Preheating region
X Preheating region
Y Preheating region
Z Middle region

The invention claimed is:
1. A method for producing metal oxide particles, which comprises subjecting a reaction gas containing metal chloride and an oxidizing gas containing no metal chloride in a reaction tube to preheating, and then subjecting a combined gas composed of the reaction gas and the oxidizing gas to main heating in a main heating region apart from the downstream side of the junction, wherein
the time until the combined gas from the junction arrives at the upstream end of the main heating region through a middle region, at which no heating device is provided, is adjusted to be 8 milliseconds to less than 25 milliseconds, wherein at least one of a light shield plate and a heat shield plate is provided outside the reaction tube at the middle region.

2. The method for producing metal oxide particles according to claim 1, wherein the reaction tube includes a double-tube structure portion composed of a hollow outer cylinder and a hollow inner cylinder inserted into the upstream side of the hollow outer cylinder, and the reaction gas is allowed to flow into the hollow inner cylinder and also the oxidizing gas is allowed to flow into a site between the hollow inner cylinder and the hollow outer cylinder, thereby allowing the downstream end portion of the hollow inner cylinder to serve as the junction of the reaction gas and the oxidizing gas.

3. The method for producing metal oxide particles according to claim 1, wherein the metal chloride is titanium tetrachloride, and the metal oxide particles are titanium oxide particles.

4. The method for producing metal oxide particles according to claim 3, wherein the titanium oxide particles are decahedral titanium oxide particles.

5. The method for producing metal oxide particles according to claim 1, wherein the preheating temperature is 136° C. or higher and 750° C. or lower.

6. The method for producing metal oxide particles according to claim 1, wherein the main heating temperature is 800° C. or higher and 1,500° C. or lower.

7. The method for producing metal oxide particles according to claim 1, wherein the reaction gas contains an oxygen gas and/or a nitrogen gas.

8. The method for producing metal oxide particles according to claim 1, wherein the oxidizing gas contains an oxygen gas, a nitrogen gas, argon, water vapor, or at least two kinds thereof.

9. The method for producing metal oxide particles according to claim 1, wherein a linear velocity of the oxidizing gas is adjusted to be within a range of from 0.1 to 10 based on a linear velocity of the reaction gas on the upstream side of the downstream end portion of the hollow inner cylinder.

10. The method for producing metal oxide particles according to claim 3, wherein the concentration of titanium tetrachloride contained in the combined gas is adjusted to be from 0.1 to 20% by volume on the downstream side of the downstream end portion of the hollow inner cylinder.

11. The method for producing metal oxide particles according to claim 1, wherein the time during which the combined gas remains in the main heating region is adjusted to be from 2 to 500 milliseconds.

12. The method for producing metal oxide particles according to claim 1, wherein the Reynolds number of the combined gas is adjusted to be from 10 to 10,000.

13. The method for producing metal oxide particles according to claim 1, wherein the middle region is a non-heating region.

* * * * *